US011704755B2

(12) United States Patent
Felemban et al.

(10) Patent No.: US 11,704,755 B2
(45) Date of Patent: Jul. 18, 2023

(54) SCHEDULING TECHNIQUES FOR SPATIO-TEMPORAL ENVIRONMENTS

(71) Applicants: Emad Felemban, Makkah (SA); Faizan Ur Rehman, Makkah (SA)

(72) Inventors: Emad Felemban, Makkah (SA); Faizan Ur Rehman, Makkah (SA)

(73) Assignee: UMM AL-QURA UNIVERSITY, Makkah (SA)

( * ) Notice: Subject to any disclaimer, the term of this patent is extended or adjusted under 35 U.S.C. 154(b) by 141 days.

(21) Appl. No.: 17/500,871

(22) Filed: Oct. 13, 2021

(65) Prior Publication Data
US 2022/0180459 A1 Jun. 9, 2022

Related U.S. Application Data

(63) Continuation of application No. 17/114,492, filed on Dec. 8, 2020, now Pat. No. 11,151,668.

(51) Int. Cl.
G06Q 10/06 (2023.01)
G06Q 50/14 (2012.01)
(Continued)

(52) U.S. Cl.
CPC ............ G06Q 50/14 (2013.01); G01C 21/343 (2013.01); G01C 21/3691 (2013.01); G06F 7/08 (2013.01);
(Continued)

(58) Field of Classification Search
CPC .... G08G 1/0112; G08G 1/0133; H04L 43/08; H04L 47/11; H04L 47/32
(Continued)

(56) References Cited

U.S. PATENT DOCUMENTS 8,195,598 B2   6/2012  Hua et al.
8,519,845 B2   8/2013  Mohandes
(Continued)

FOREIGN PATENT DOCUMENTS

WO   WO-2019203804 A1  * 10/2019

OTHER PUBLICATIONS

Wood, Jo, Jason Dykes, and Aidan Slingsby. "Visualisation of Origins, Destinations and Flows with OD Maps." Cartographic journal 47.2 (2010): 117-129. Web. (Year: 2010).*

(Continued)

Primary Examiner — Akiba K Robinson
(74) Attorney, Agent, or Firm — Hipp Law

(57) ABSTRACT

Approaches for determining scheduling assignments for the movement of people along a multi-segment path from a starting location to a destination location, are used to manage crowds, predict crowd behavior, and mitigate crowd turbulence. For example, to mitigate crowd congestion, routing solutions specifying an amount of time to spend at a destination and a departure time can be provided. Itinerary assignments, crowd data, and data associated with an event can be analyzed and weighted to determine scheduling assignments. Scheduling assignments can be validated against current crowd data and event data. Current crowd data and event data and crowd simulation can be used to (Continued)

predict future crowd behavior or crowd problems. Scheduling assignments can be rescheduled to mitigate crowd problems or emergencies.

20 Claims, 13 Drawing Sheets

(51) Int. Cl.
```
G06Q 10/02       (2012.01)
G06Q 10/047      (2023.01)
G06Q 50/26       (2012.01)
G06Q 30/018      (2023.01)
G06F 7/08        (2006.01)
G01C 21/34       (2006.01)
G01C 21/36       (2006.01)
G06F 16/9537     (2019.01)
G06V 20/52       (2022.01)
G06Q 30/0201     (2023.01)
G06Q 10/10       (2023.01)
G06Q 10/0631     (2023.01)
```
(52) U.S. Cl.
CPC ....... *G06F 16/9537* (2019.01); *G06Q 10/025* (2013.01); *G06Q 10/047* (2013.01); *G06Q 30/018* (2013.01); *G06Q 50/26* (2013.01); *G06V 20/53* (2022.01); *G06Q 10/06312* (2013.01); *G06Q 10/10* (2013.01); *G06Q 30/0201* (2013.01)

(58) Field of Classification Search
USPC ......... 705/7.11, 7.12, 7.13, 7.16, 7.22, 7.23; 340/905, 906, 907
See application file for complete search history.

(56) References Cited

U.S. PATENT DOCUMENTS

| | | |
|---|---|---|
| 9,672,734 B1 * | 6/2017 | Ratnasingam .......... H04W 4/44 |
| 2016/0188969 A1 | 6/2016 | Chung et al. |
| 2019/0208365 A1 | 7/2019 | Benrachi et al. |

OTHER PUBLICATIONS

Meng, Xiangxu et al. "Intention-Oriented Itinerary Recommendation Through Bridging Physical Trajectories and Online Social Networks." KSII transactions on Internet and information systems 6.12 (2012): 3197-3218. Web. (Year: 2012).*

Akhlaq Ahmad, MD. Abdur Rahman, Faizan Ur Rehman, Ahmed Lbath, Imad Afyouni, Abdelmajid Khelil, Syed Osama Hussain, Bilal Sadiq, Mohamed Ridza Wahiddin, "A framework for crowd-sourced data collection and context-aware services in Hajj and Umrah," 2014.

Bilal Sadiq, Akhlaq Ahmad, Shahbaz Atta, Emad Felemban, Khalid Qahtani, "STSM—a model to detect and predict large crowd anomalies for optimized path recommendation," 2017.

Haase Knut, Kasper Mathias, Koch Matthes, Müller Sven, "A Pilgrim Scheduling Approach to Increase Safety During the Hajj," Jan. 25, 2019.

Mohd nor Akmal Khalid, Umi Kalsom Yusof, Ahamad Tajudin Khader, "Survey on crowd guidance's optimization algorithm for emergency route planning and management problems," Mar. 2015.

Notice of Allowance, "Notice of Allowance dated Jun. 17, 2021," U.S. Appl. No. 17/114,492, filed Jun. 17, 2021, 8 Pages.

Office Action, "Non-final Office Action dated Feb. 24, 2021," U.S. Appl. No. 17/114,492, filed Feb. 24, 2021, 19 pages.

Vaibhav Rajan, Sakyajit Bhattacharya, L. Elisa Celis, Deepthi Chander, Koustuv Dasgupta, Saraschandra Karanam, "CrowdControl: An online learning approach for optimal task scheduling in a dynamic crowd platform," 2013.

* cited by examiner

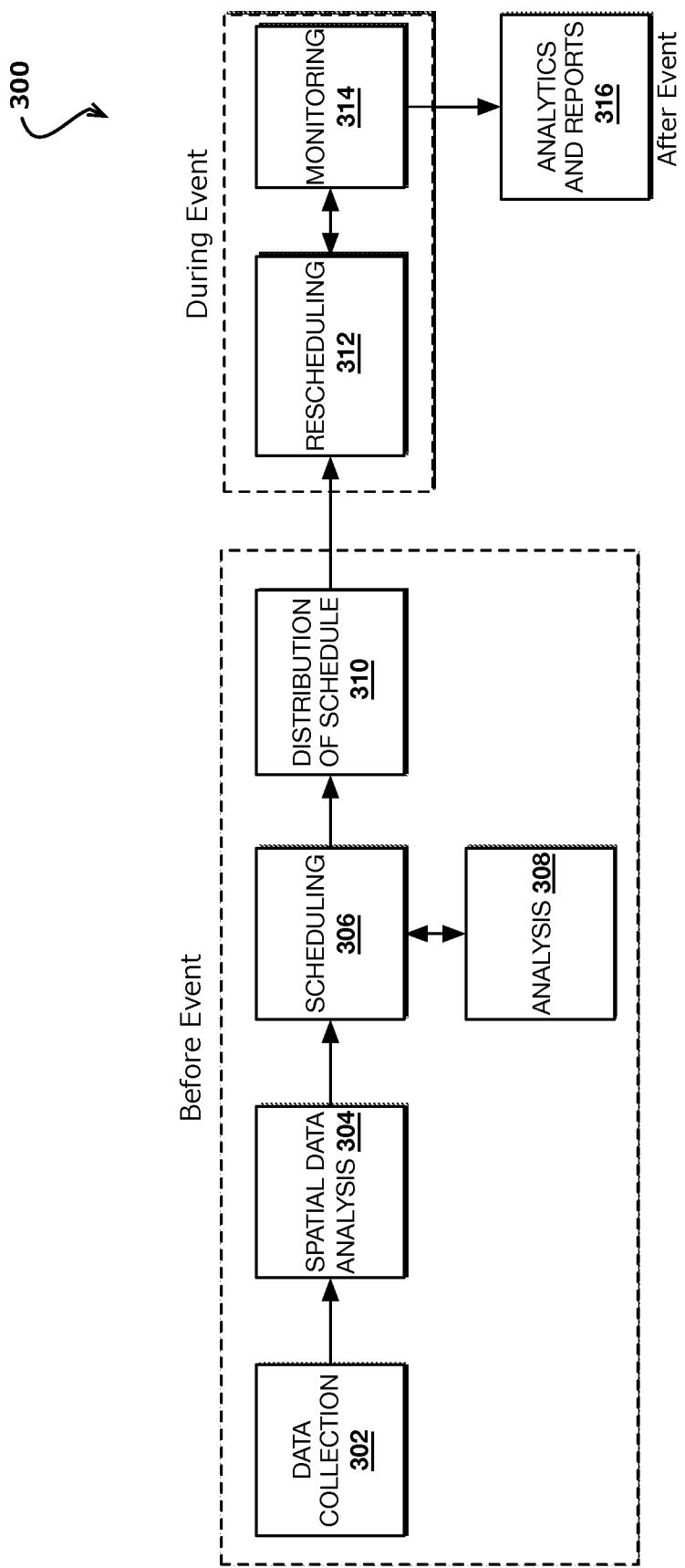

SCHEDULING TECHNIQUES FOR SPATIO-TEMPORAL ENVIRONMENTS

CROSS REFERENCES TO RELATED APPLICATIONS

This application is a continuation of U.S. application Ser. No. 17/114,492, entitled "CAPACITY CONSTRAINED AND USER PREFERENCE BASED SCHEDULER, RESCHEDULER, SIMULATION, AND PREDICTION FOR CROWDS IN SPATIO-TEMPORAL ENVIRONMENTS," filed Dec. 8, 2020; which the full disclosure of this application is incorporated herein by reference for all purposes.

BACKGROUND

In events involving large gatherings, such as religious events, sports events, festivals, or concerts, it is important to ensure that participants are moving safely, efficiently, and appropriately through the venue. As crowd sizes increase, so does the risk for turbulence due to the crowd's random, unintentional, and uncontrolled movements. Severe risks include stampedes and casualties. Various factors may affect a crowd's movement and behavior. Such factors may include congestion, the crowd's pace, environmental conditions such as weather and landscape, structural conditions such as steep steps and occupancy thresholds, government regulations such as restricted route access, and individual participants' itineraries. Some of these factors may be conflicting. For example, a crowd's movement toward one area due to inclement weather may conflict with a governmental regulation restricting access to such area. As such, it is difficult to monitor all of these factors, predict crowd dynamics, and determine effective routing solutions to manage the crowd. It is also difficult to efficiently modify routing solutions in response to the dynamic nature of crowd management factors, such as sudden changes in weather or reaching a structure's occupancy threshold.

An example of an event requiring crowd management is Hajj, an annual religious gathering held in Makkah Mukarramah (Mecca), Saudi Arabia, for five days, attended by over 2 million pilgrims from around the world. Pilgrims visit and gather at various sites to perform religious rituals. As pilgrims navigate through sites, they may experience crowd overflow and bottlenecks. Crowd behavior at Hajj can be influenced by various factors. For example, crowds may become congested at structures such as tunnels or the Jamarat bridge, or each pilgrim visits different sites and at different times within his or her itinerary depending on the pilgrim's school of Islamic jurisprudence. Past Hajj events have experienced injuries and casualties due to the ineffective mitigation of crowd congestion.

As with Hajj, crowd management in other types of large gathering events must be able to schedule crowd movement to ensure that crowds navigate the event safely and effectively. Further, crowd management must be able to predict crowd behavior and accommodate changes in crowd participants' itineraries, environmental conditions, or other factor changes. Therefore, it is desirable to provide improved techniques for effective and dynamic scheduling of crowd movement for crowd management.

BRIEF DESCRIPTION OF THE DRAWINGS

Various embodiments in accordance with the present disclosure will be described with reference to the drawings, in which:

FIG. 3 illustrates an example process for scheduling crowd movement in accordance with various embodiments;

DETAILED DESCRIPTION

Figure 1:
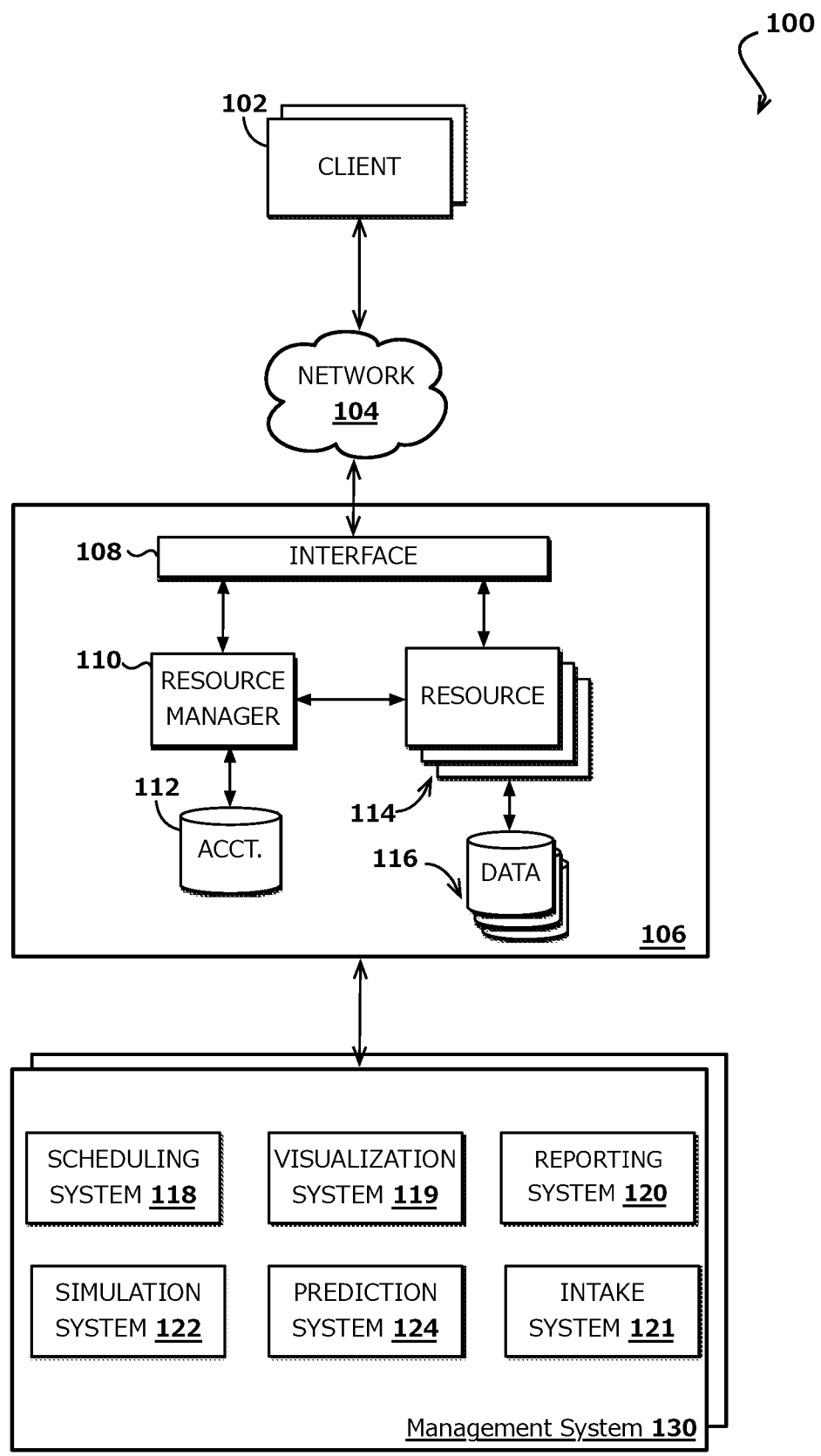
FIG. 1 illustrates an example environment in which aspects of the various embodiments can be implemented.

Systems and methods in accordance with various embodiments of the present disclosure may overcome one or more of the aforementioned and other deficiencies experienced in conventional approaches crowd management. In particular, various embodiments describe approaches for determining scheduling assignments for the movement of people along a path from a starting location to a destination location that can be used to, for example, provide routing solutions to mitigate crowd congestion, avoid conflicts in directional flow within a crowd, divert crowds from dangerous weather, meet parameters of people's itineraries, accommodate changes in people's itineraries, and the like. The scheduling process can be utilized by participants at large gatherings, event administrators, transportation stakeholders, among others.

In accordance with various embodiments, a path within a large gathering event is divided into segments. Within each segment, crowd data associated with the large gathering event is collected. Collected data may include the itineraries of each crowd participant specifying the participant's desired destinations and visit times. The collected data may include crowd data, such as the number of people within a crowd, the pace of the crowd, societal or religious customs, or other data associated with characteristics of the crowd participants. The collected data may also include event data, such as the capacity of roads and buildings, government regulations, environmental conditions such as rain, or other data associated with an event's environment, time, and location. The collected data may be gathered from various sources such as user input, video or image sources, among others. Based on the collected data, scheduling assignments are determined to move the crowd through each segment. Scheduling assignments may include, for example, individual routings solutions specifying an amount of time to spend at each destination and departure time from an original location, a waiting segment, a waiting time of day, and a waiting location, among others, to avoid crowd turbulence such as congestion or stampede.

In at least some embodiments, scheduling assignments can be visualized on a map. Map visualization may present the number of people assigned to each path or location. Scheduling assignments may be validated against current or predicted crowd behavior through simulation techniques and may be automatically modified to accommodate real-time crowd behavior. Users may submit rescheduling requests through interactive rescheduling interfaces, based on, for example, user preferences. Scheduling assignments may be automatically modified to mitigate environmental factors, such as rain, fire, or stampede.

Instructions for causing a computer system to facilitate crowd management in accordance with the present disclosure may be embodied on a computer-readable medium. For example, in accordance with an embodiment, a backend system can process a request for scheduling time for travel between a plurality of destinations along a multi-segment path for a plurality of participants. A plurality of itineraries for the request is collected, along with respective itinerary characteristics for the plurality of itineraries (e.g., event start and stop times, accessibility, or capacity of roads and buildings, movement accommodations and/or restrictions, etc.). The backend system can evaluate the plurality of itineraries based on the respective itinerary characteristics and environmental characteristics (e.g., current and predicted weather conditions, road conditions, structural capacity, etc.) along the multi-segment path to generate itinerary scores. The backend system can utilize a scheduler component to generate a sorted list of itineraries based on the itinerary scores. The scheduler component can generate a routing solution for individual groups from the sorted list. The routing solution can then be used to, for example, provide recommendations specifying an amount of time to spend at each destination and departure time from an original location, a waiting segment, a waiting time of day, and a waiting location, among others, that can be used for managing a crowd, fleet management, organizing security at events, organizing emergency services at large gatherings, etc.

Embodiments provide a variety of advantages. For example, in accordance with various embodiments, computer-based approaches for scheduling routing solutions can be utilized by any system that attempts to optimize crowd management resources or process large datasets, including computing systems such as event planning systems, transportation systems, emergency services deployment systems, and the like. Such systems can improve the operation and performance of the computing devices on which they are implemented by, among other advantages, efficiently managing large data sets relating to large crowds through, for example, collecting and ingesting large volumes of data, generating sorted lists of itineraries for each user in the crowd, and continually updating the itineraries for each user based on continuous ingestion of the data. These systems may be utilized by, for example, event management platforms, transportation platforms, emergency services platforms, and other environments where decisions-based processing of large datasets relating to managing large gatherings of people may be needed. In accordance with various embodiments, by providing a system that schedules routing solutions for each user in a crowd that mitigates crowd turbulence, the system can more efficiently store and process large data sets. For example, scheduling routing solutions for each user and updating the routing solutions as more crowd data is collected and analyzed, promotes crowd management and crowd safety. The process is improved by using computer-based techniques to optimize resource utilization of various resources and processing power in real-time management of large datasets. In certain embodiments, crowd behavior is predicted, and the prediction is analyzed with a real-time simulation of current crowd behavior and/or other environmental characteristics (e.g., sudden severe weather). The prediction analysis allows the system to circumvent various data collection and processing steps when rescheduling itinerary assignments to mitigate potential or otherwise unforeseen crowd turbulence. This lowers operational complexity on the computing system and allows for optimization of computing power, allowing for scalable analysis of large datasets and lower maintenance costs. Being able to efficiently process big data (large datasets) allows for real-time decision making, which is critical when managing large crowds. Further, approaches described herein advantageously provide for improved responses to real-time event conditions (e.g., environmental conditions, impending closing times, emergencies, etc.). This can reduce idle resources and conserve processing power, which can increase efficiency in data processing.

Various other functions and advantages are described and suggested below as may be provided in accordance with the various embodiments.

FIG. 1 illustrates an example environment 100 in which aspects of the various embodiments can be implemented. In this example, a user can utilize a client device 102 to communicate across at least one network 104 with a resource provider environment 106. The client device 102 can include any appropriate electronic device operable to send and receive requests or other such information over an appropriate network and convey information back to a user of the device. Examples of such client devices 102 include personal computers, tablet computers, smartphones, notebook computers, and the like. The user can include a person authorized to manage the aspects of the resource provider environment.

The resource provider environment 106 can provide crowd management support services for companies for various services. These services can include, for example, scheduling services, transportation services, travel services, navigation services, event management services, security services, law enforcement services, emergency services, among other such services where scheduling the movement of people can be considered. In certain embodiments, the resource provider of environment 106 can be an intermediary between a customer and crowd management service. The provider can, for example, assist a company by providing crowd management services for the company. This can include, for example, predicting crowd behavior in response to environmental conditions such as rain, determining routing solutions to move crowds safely through an area while complying with government regulations of restricted access areas, determining the number of people expected to arrive at a specific location and the length of time they are expected to visit the location, etc. In various embodiments, the crowd management and other services can be performed in hardware and software, or combination thereof.

The network(s) 104 can include any appropriate network, including an intranet, the Internet, a cellular network, a local area network (LAN), or any other such network or combination, and communication over the network can be enabled via wired and/or wireless connections.

The resource provider environment 106 can include any appropriate components for receiving customer support requests and returning information or performing actions in response to those requests. It should be noted that although the techniques described herein may be used for a wide variety of users and requests, for clarity of presentation, examples of companies responding to a crowd management services request will be used. The techniques described herein, however, are not limited to crowd management requests, and responses may be provided to requests from users who are not seeking crowd management services, and responses may be from any entity or person.

The resource provider environment 106 might include Web servers and/or application servers for determining scheduling assignments that can be used to, for example, provide routing solutions for crowd management, and the like. While this example is discussed with respect to the internet, web services, and internet-based technology, it should be understood that aspects of the various embodiments can be used with any appropriate services available or offered over a network in an electronic environment.

In various embodiments, resource provider environment 106 may include various types of resources 114 that can be used to facilitate crowd management services. The resources can include, for example, scheduling system 118, visualization system 119, reporting system 120, simulation system 122, prediction system 124, intake system 121, application servers operable to process instructions provided by a user or database servers operable to process data stored in one or more data stores 116 in response to a user request.

Intake system 121 is operable to obtain crowd data and event data from various sources for various geographical locations. Crowd data may include data associated with crowds and crowd behavior. Event data may include data associated with crowd environment, venue, time of event, etc.

Scheduling system 118 is operable to process the crowd data to determine scheduling assignments for moving a crowd through a geographical location. For example, scheduling system 118 may assign schedules for crowds as to how long a crowd should stay at a location, when it should move to another location, and recommend a routing solution for reaching the next destination.

Simulation system 122 is operable to gather real-time crowd data and impose the real-time crowd data onto a map. For example, simulation system 122 can gather video feed of a crowd moving in real-time in a geographical location, and project a virtualization of the real-time crowd density and crowd flow on a virtualized map of the geographical location. Simulation system 122 can determine if crowd behavior has changed since a scheduling assignment, such that the scheduling assignment should be modified to accommodate the change in crowd behavior.

Visualization system 119 is operable to project the scheduling assignments and analyzed crowd data in an interactive graphical rendition. Users can interact with the interactive graphical rendition to submit requests to modify scheduling assignments. The interactive graphical rendition may help users in selecting among routing solutions by providing, for example, visualization of current crowd density in a geographic location or areas of potential crowd turbulence.

Prediction system 124 is operable to forecast crowd behavior and event circumstances. For example, prediction system 124 can monitor current crowd behavior and progress and analyze crowd data, such as environmental factors or time of day, to predict how a crowd may behave in the immediate future, such as within 30 minutes or 1 hour. The predicted crowd behavior is simulated in a virtualization of predicted crowd density and crowd flow on a virtualized map of the geographical location. Prediction system 124 may also determine when a crowd will reach crowd limitations, such as structural occupancy thresholds, or ensure there are no conflicts in directional flow within a crowd. Predicted crowd behaviors may be used to determine whether the scheduling assignments are appropriate for the crowd or should be modified to accommodate crowd data that was not available during the determination of the original scheduling assignments. Prediction can help the stakeholders to be in the state of preparedness to handle the situation Reporting system 120 is operable to communicate the scheduling assignments to the user. For example, reporting system 120 may send alerts to users of modifications to scheduling assignments, or generate and present reports on recommended routing solutions based on the scheduling assignments.

The resources may be hosted on multiple server computers and/or distributed across multiple systems. Additionally, the components may be implemented using any number of different computers and/or systems. Thus, the components may be separated into multiple services and/or over multiple different systems to perform the functionality described herein. In some embodiments, at least a portion of the resources can be "virtual" resources supported by these and/or components.

In at least some embodiments, an application executing on the client device 102 that needs to access resources of the provider environment 106, for example, to initiate an instance of crowd management service, routing solution, etc., can submit a request that is received to interface layer 108 of the provider environment 106. The interface layer 108 can include application programming interfaces (APIs) or other exposed interfaces, enabling a user to submit requests, such as Web service requests, to the provider environment 106. Interface layer 108 in this example can also include other components as well, such as at least one Web server, routing components, load balancers, and the like.

When a request to access a resource is received at the interface layer 108 in some embodiments, information for the request can be directed to resource manager 110 or other such systems, service, or component configured to manage user accounts and information, resource provisioning and usage, and other such aspects. Resource manager 110 can perform tasks such as communicating the request to a management component or other control component which can be used to manage one or more instances of a crowd management service or routing solution service as well as other information for host machines, servers, or other such computing devices or assets in a network environment, authenticate an identity of the user submitting the request, as well as to determine whether that user has an existing account with the resource provider, where the account data may be stored in at least one data store 112 in the resource provider environment 106.

For example, the request can be used to instantiate a crowd management service or routing solution service on management system 130. The service (e.g., crowd management, routing solution, etc.) can utilize intake system 121, scheduling system 118, simulation system 122, visualization system 119, prediction system 124, and reporting system 120, to determine scheduling assignments for moving crowds in a geographic location that can be used for event planning, emergency services planning, transportation planning, generate real-time status reports, etc. It should be noted that although management system 130 is shown outside the provider environment, in accordance with various embodiments, one or more modules of the crowd management service can be included in provider environment 106, while in other embodiments, some of the modules may be included in the provider environment. It should be further noted that management system 130 can include or at least be in communication with other components, for example, a customer support session manager, etc.

Figure 2A:
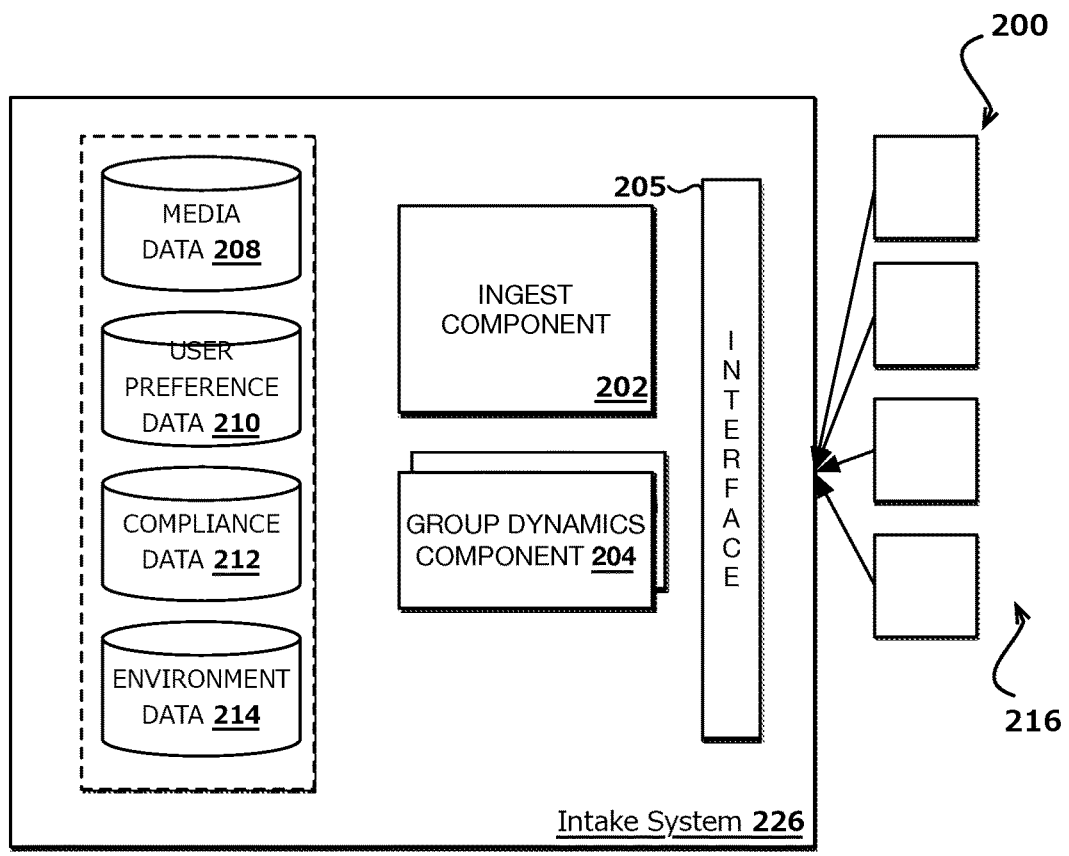
FIGS. 2A, 2B, 2C, 2D, and 2E illustrate example components for scheduling crowd movement in accordance with various embodiments.

FIG. 2A illustrates example 200 of intake system 226 in accordance with an embodiment. Intake system 226 can include ingest component 202 and group dynamics component 204.

Ingest component 202 is operable to receive through interface 205 a selection of sources 216 for one or more geographic locations for a large gathering of people. In various embodiments, interface 205 may include a data interface and service interface may be configured to periodically receive data sets, requests, and/or any other relevant information to facilitate crowd management and display of such information. Interface 205 can include any appropriate components known or used to receive requests or other data from across a network, such as may include one or more application programming interfaces (APIs) or other such interfaces for receiving such requests and/or data.

The sources can include, for example, user input, video/image devices, local authorities, weather monitors, and structural inspection reports. Examples of user input may include individual participants' itineraries specifying their desired destinations and visit times, or user preferences or characteristics influencing the itineraries, such as cultural or religious customs. For example, during the Hajj pilgrimage, user preferences or characteristics may include a participant's school of Islamic jurisprudence, which establishes guidelines for which destinations and visit times within Mecca should be included in the participant's itinerary. In certain embodiments, a configuration file or other instructions can be obtained that specifies one or more geographic locations and/or crowds.

Once the sources are identified, a variety of methodologies may be used to retrieve the relevant crowd data via interface 205, including but not limited to, data scrapes, API access, etc. When data associated with a crowd is received from the selection of sources 216, ingest component 202 processes and stores the crowd data into the appropriate database based on the data's source. The crowd data can be stored in media data store 208, user preference data store 210, compliance data store 212, environment data store 214, or other appropriate data store. In an example, the crowd data can be stored in a format that can be consumed by one or more other components. For example, this may include but is not limited to a flat file, non-relational or relational database, or any other readily available electronic medium. Data received from media sources, such as images of a crowd in a geographic location showing crowd density, video footage of crowd directional flow and pace along a path, may be stored in media data store 208. Data received from user input sources, for example, a participant's itinerary of desired destinations and visit times, or user preferences or characteristics such as cultural or religious customs which guide or restrict the participant's itinerary, may be stored in user preference data store 210. Data received from compliance sources, for example, a list of restricted access areas regulated by local authorities, may be stored in compliance data store 212. Data received from environmental sources, for example, weather forecasts in the crowd's location from weather monitors, may be stored in environment data store 214.

Group dynamics component 204 is operable to process collected crowd data in the media data store 208, user preference data store 210, compliance data store 212, and/or environment data store 214, to determine interactions of people within the crowd. The interactions can be used to determine whether there is crowd turbulence (e.g., congestion, stampede, etc.), arising from conflicts between people within the crowd, such as conflicts in directional flow (e.g., people are obstructing each other's paths within a crowd along a segment of a path), whether the crowd is at a standstill, the pace of a unidirectionally moving crowd to indicate smooth flow or stampede, etc.

In an embodiment, each component and/or subcomponent of crowd data is categorized into data types including media data, user preference data, compliance data, or environment data. A value can be determined for each crowd data component and/or subcomponent. In a specific example, a value can be determined for crowd density captured through video footage (media data), effect on pace of the crowd based on difficulty of terrain (environment data), location open and closure times (compliance data), etc. Values can be combined to generate a score for media data, a score for user preference data, a score for compliance data, and a score for environment data. The scores among the data types may be combined and weighted, averaged, etc., into a group dynamics score. The group dynamics score may be compared with a predetermined range of scores, to determine the level of interactions of people within the crowd. In another embodiment, the scores of each data type are kept separate as a set of a plurality of data type scores (a group dynamics score set), and the set of the plurality of data type scores is compared with predetermined score sets. In this example, a group dynamics score set with a high environment data score (e.g., worsening weather, difficult terrain, etc.) and high compliance data score (e.g., impending event closure times) can be used to determine that interactions are likely to result in crowd turbulence (e.g., participants are more likely to rush from a location and collide with or obstruct each other, indicating crowd congestion).

In an embodiment, a change in interactions may indicate an emergency such as fire or flood, or crowd turbulence such as congestion or stampede, etc. A plurality of people within a crowd may head in a plurality of directions as to obstruct each other's path, thereby creating congestion along the segment. Interactions may change based on, for example, an increase or decrease in the number of people visiting a segment compared to an expected number of people visiting at a given point in time. Where there is a change in interactions, scheduling assignments (also referred to as itinerary assignments or routing solutions) may be modified, for example, to provide new routing solutions to redirect the crowd away from the emergency or turbulence. For example, crowd data such as video footage may indicate low crowd density, crowd moving at a slow or moderate pace, and weather monitors may indicate calm weather. Current group dynamics score may be low, indicating low collision rate in interactions of people in the crowd. In this example, new crowd data may indicate sudden high crowd density, crowd moving unidirectionally at a fast pace, and flood. Group dynamics score may increase and exceed a predetermined range, indicating higher collision and obstruction rate in interactions of people in the crowd. In this example, the change in interactions may be used to determine stampede, and therefore, that scheduling assignments should be modified to disperse the crowd, redirect the crowd through alternative paths, move multiple groups of the crowd through a path at different times, etc.

Figure 2B:
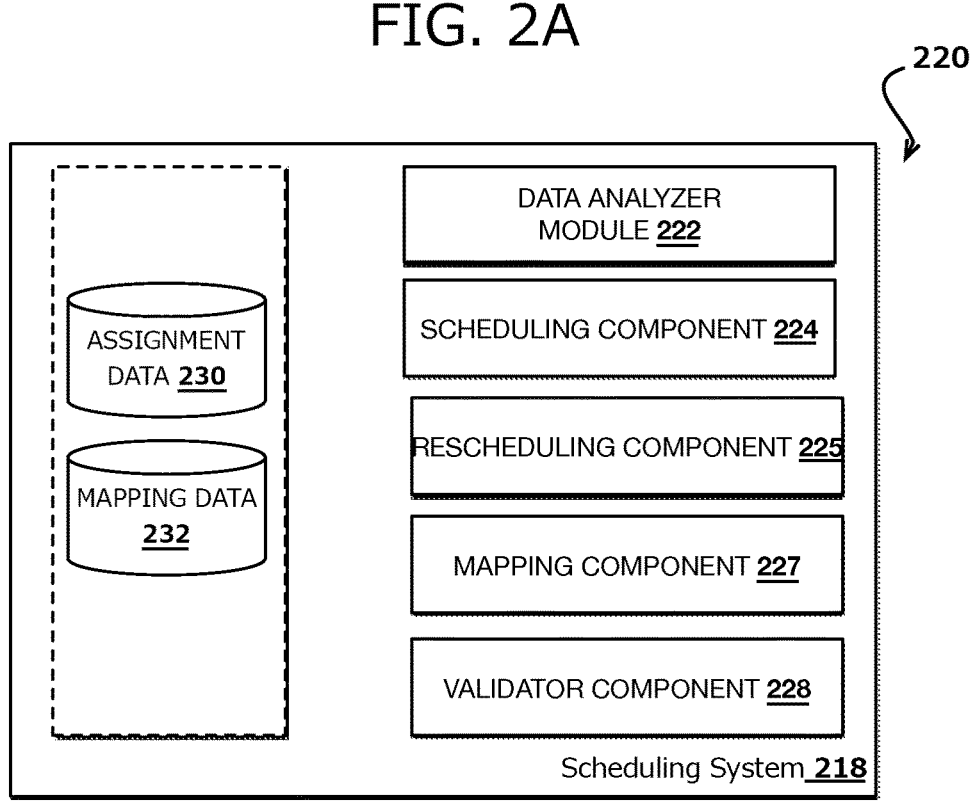

FIG. 2B illustrates example 220 of scheduling system 218 in accordance with an embodiment. Scheduling system 218 includes data analyzer module 222, scheduling component 224, rescheduling component 225, mapping component 227, and validator component 228. In this example, itinerary assignments are determined by scheduling system 218. That is, scheduling system 218 may provide itinerary assignments (also referred to as routing solutions or scheduling assignments) for moving a group of people within a crowd to one location at a recommended time while directing another group of people from the crowd to another location and remain there for a recommended period, to mitigate crowd congestion during rainy weather. Itinerary assignments may specify an amount of time to spend at each destination and departure time from an original location, a waiting segment, a waiting time of day, a waiting location, and navigation directions along a recommended path to reach the next destination, among others.

In an example, itineraries assigned to participants, stored in user preference data store 210, may be identified and stored in assignment data store 230. Mapping data collected in compliance data store 212 and/or environment data store 214 may be identified and stored in mapping data store 232. Mapping data collected from compliance data store 212 may include roads, highways, streets, addresses, coordinates, etc. Mapping data collected from environment data store may include terrain, elevation, etc.

Data analyzer module 222 is operable to process crowd data from media data store 208, user preference data store 210, compliance data store 212, environment data store 214, assignment data store 230, and/or mapping data store 232. For a given segment along a path, data analyzer module 222 analyzes combination of data appropriate for moving a crowd through the segment. For example, in a segment, data analyzer module 222 may consider that media data indicates high crowd density, environment data indicates dry weather and excessive heat, compliance data indicates early closure of the area, and user preference data indicates that most participants of the crowd may experience exhaustion and reduce pace after walking a certain distance. From the collected itinerary assignment data, data analyzer module 222 may consider when each participant should arrive at a location and the length of the visit, and determine that, from compliance data, at a certain time, the number of people expected to visit a location exceeds the location's structural occupancy threshold. From the collected mapping data, data analyzer module 222 may determine that the distance between starting location and destination is short and manageable for the crowd's demographics, and that the terrain is a smooth and steady decline.

Scheduling component 224 is operable to process the combined data from data analyzer module 222 to determine itinerary assignments for the crowd. If sets of data from data analyzer module 222 conflict, scheduling component 224 may reconcile the conflict. In an example, a plurality of itinerary assignments from assignment data store 230 may indicate that a number of participants expect to visit a bridge at the same time, but mapping data from mapping data store 232 indicates such number of participants exceeds the maximum weight that the bridge can safely support. Scheduling component 224 may weigh the plurality of itinerary assignments against the combined data from data analyzer module 222, for example, mapping data that suggests alternative paths with pedestrian-friendly terrain, or user preferences data that suggests that some participants' religious customs have stricter requirements to visit and perform rituals at the bridge than do other participants'. Based on the weighed analysis, scheduling component 224 may generate itinerary scores and arrange the itinerary assignments in a sorted list. Scheduling component 224 may group participants from the sorted list and generate routing solutions by the groups of participants. For example, participants may be grouped based on origin, availability, travel restrictions, etc. The routing solutions may assign a navigation path for a group to arrive at the bridge, a length of time the group may spend at the bridge, and a time to depart before the next group is assigned to visit. The routing solutions may also include a segment along a path, time, and location where group participants may wait.

Mapping component 227 is operable to process mapping data from mapping data store 232. For example, for a segment along a path, mapping component 227 may analyze the geography of the segment and determine whether the area is suitable for crowds. The geography of a segment may include challenging terrain for walking, such as high elevation, steep steps, or rocky incline, or wide walkways that can accommodate egress of large crowds. In an embodiment, mapping component 227 may process local government data from compliance data store 212, such as unexpected road closures.

Validator component 228 is operable to validate the itinerary assignments against collected crowd data, to determine whether the crowds are meeting their itinerary assignments and whether the itinerary assignments need to be rescheduled based on current crowd data. A crowd that follows an original itinerary assignment that is not validated may encounter crowd turbulence, such as crowd congestion or delays in arriving at a destination, due to changes such as sudden extreme weather, participants accidentally taking an incorrect path, road closures, etc. Validator component 228 simulates the outcome of following the original itinerary assignments (e.g., simulate the resulting crowd density, congestion, turbulence, etc. under the original itinerary assignments) to calculate simulated arrival times or departure times. The simulated times are compared with the original estimated arrival times or departure times designated in the original itinerary assignments. If the simulated times deviate from the original estimated times by a predetermined range, validator component 228 may invalidate the itinerary assignments and require the itinerary assignments to be rescheduled.

Data analyzer module 222 may identify collected crowd data in the media data store 208, user preference data store 210, compliance data store 212, and/or environment data store 214 as real-time data or static data. Validator component 228 may operate in real-time mode or static mode. In an example, validator component 228 operating in static mode may compare the itinerary assignments with static data such as the total size of the crowd at the event and road capacity. Based on the static data, validator component 228 may determine a possible bottleneck at a segment. Validator component 228 determines whether the itinerary assignments will move groups in the crowd as to avoid the bottleneck. If validator component 228 determines the itinerary assignments will result in a bottleneck, the itinerary assignments will be modified. In another example, validator component 228 operating in real-time mode may continuously process the current number of participants along a road and upcoming arrival or departure times from itinerary assignment data for locations accessed by the road. Comparing real-time data with the itinerary assignments, validator component 228 monitors whether the real-time movement of groups in the crowd to meet the estimated times listed in the itinerary assignments may cause the road to reach capacity. That is, validator component 228 can monitor the progress of the groups of crowds. If validator component 228 determines the itinerary assignments will cause the road to reach capacity, the itinerary assignments will be modified.

Rescheduling component 225 is operable to modify the itinerary assignments based on invalidation of itinerary assignments by validator component 228. In an example, itinerary assignments may be invalidated when groups in a crowd are delayed in meeting their itinerary assignment due to rain, crowd congestion along a path, destination closure by local authorities, or making an error in navigation (e.g., taking a wrong turn). Rescheduling component 225 may generate modified itinerary assignments (also referred to as modified routing solutions) with updated departure times and paths to mitigate the delay and allow crowd participants to satisfy their itinerary assignments. In another example, crowd congestion may be caused by conflicts in directional flow within the crowd (e.g., groups in a crowd may head in different directions as to obstruct another group's path along a segment). Rescheduling component 225 may modify itinerary assignments to include routing solutions that move all groups within the crowd in a common direction, therefore ensuring paths are unidirectional. Rescheduling itinerary assignments to ensure unidirectional paths in routing solutions enables crowds to, for example, evacuate during emergencies such as fires or other disasters.

Figure 2C:
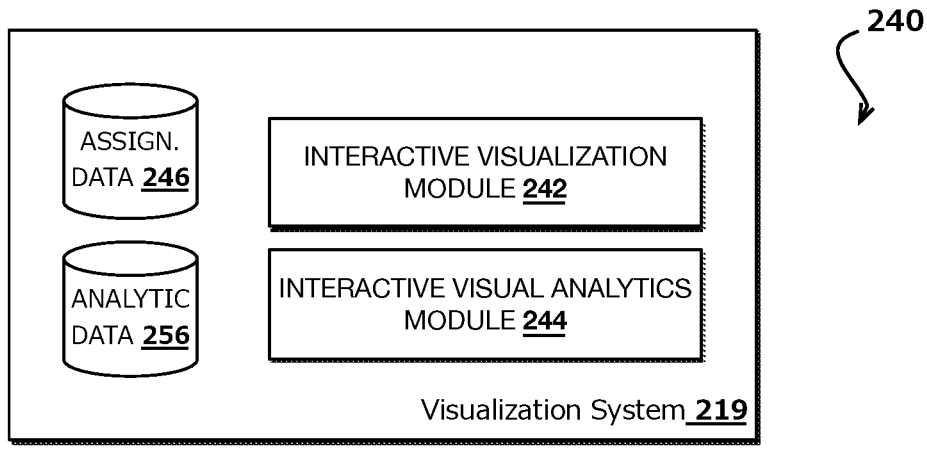

FIG. 2C illustrates example 240 of visualization system 219 in accordance with an embodiment. Visualization system 219 includes interactive visualization module 242 and interactive visual analytics module 244. Interactive visualization module 242 is operable to visualize crowd behavior data through visual output and allow a user to view and interact with the visualization. In this example, the visualization may include maps, graphs, tables, among others, and crowd behavior data may be represented by colors. Interactive visualization module 242 may provide interactive graphical user interface tools for a user to select and apply filters to various aspects of the visual output to view information on an area, such as building capacity, accessibility of roads, capacity of roads. A user may also view how various aspects of the area is affected by crowd behavior, such as total crowd size in a region, or current crowd density, pace, or direction along a path. Interactive visualization module 242 may provide interactive graphical user interface tools for a user to submit rescheduling requests, for example, based on user preferences such as safety (e.g., capacity of the road) and temporal preferences (e.g., desired time to visit a location).

Interactive visual analytics module 244 is operable to provide and process data used for generating the interactive visual output. In an example, interactive visual analytics module 244 may analyze itinerary assignment data from assignment data store 246 with spatial data of a segment, and may store the analyzed data in analytic data store 256. Destination arrival times or original location departure times from itinerary assignment data may be compared with spatial data, such as crowd density at a segment along a path between the original location and destination. Analyzed data may be generated from this comparison, for example, as a color-coded rendering of the path indicating which portions of the path will be congested at various times. In response to a user applying a filter on a visualized map to view, for example, the current crowd density along various roads, interactive visual analytics module 244 fetches appropriate data from analytic data store 256 to be visualized and displayed by interactive visualization module 242. The user may view which path among alternative paths between an original location and destination has the most congestion or least congestion, or what time a particular path will begin to have reduced congestion. In another example, when a user submits a rescheduling request, interactive visual analytics module 244 may process the request containing proposed modifications to the user's itinerary assignment and store the modified itinerary assignment data in assignment data store 246. In this example, the user's proposed new arrival times or departure times may be compared with the current weather's impact on crowd pace or density along paths between the original location and destination. The arrival times or departure times are then updated to a later or earlier time, or a different path from the original location and destination is provided and included in a modified itinerary assignment.

Figure 2D:
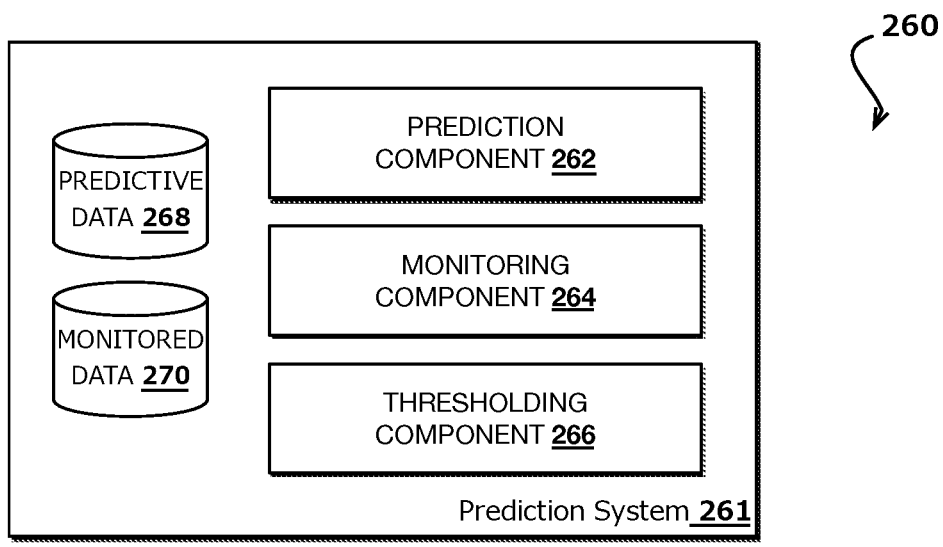

FIG. 2D illustrates example 260 of prediction system 261 in accordance with an embodiment. In this example, prediction system 261 can include prediction component 262, monitoring component 264, and thresholding component 266. In accordance with an embodiment, thresholding component 266 is operable to gather and store threshold data in monitored data store 270. Threshold data may include, for example, occupancy capacities of buildings and structures, time limits for visiting a location based on crowd size, closure times for locations, maximum density of a crowd permitted to still allow the crowd to flow through a path at a safe and steady pace, etc.

Monitoring component 264 is operable to obtain data representative of crowd behavior, and stores the monitored data in monitored data store 270. Data representative of crowd behavior can be obtained from ingest component 202, and may include media data (e.g., video or image data of crowd movement along a segment), user preference data (e.g., a user's origin, availability, travel restrictions, etc.), compliance data (e.g., event start and closure times, government restricted areas, etc.), environment data (e.g., weather conditions, terrain conditions, etc.), among others. In an example, current crowd behavior may be determined by real-time video footage of a crowd's pace through a path. Monitoring component 264 may process the current crowd behavior with current environmental data such as weather status, status of terrain quality, or variations in elevation. Current crowd behavior as impacted by current event conditions, such as weather, terrain, crowd density, and the like, is continuously observed and stored.

Prediction component 262 is operable to forecast crowd behavior and event circumstances based on monitored data in the monitored data store 270. In an example, prediction component 262 may process monitored data indicating sudden heavy rain, slippery pathways, and high number of itinerary assignments requiring people to visit a location at the same time. When monitored data indicates changes in event conditions, such as sudden heavy rain, prediction component 262 may simulate crowd behavior, for example, 30 minutes to 1 hour ahead, under the changed event conditions. The simulated crowd behavior (e.g., may be slowed crowd pace and increased density, etc.) is compared with monitored data (e.g., the crowd moves at a moderate pace and has low crowd density, but is just starting to experience the sudden heavy rain condition). Prediction component 262 may use the simulated data and the monitored data to generate predictive data suggesting that the crowd will reduce pace and therefore experience bottleneck along a segment. The predictive data of the bottleneck along the segment may be stored in predictive data store 268. In another example, prediction component 262 may compare monitored data with threshold data to predict that crowd density at a location at a certain time will exceed occupancy threshold. Prediction component 262 may send an alert when predictive data indicates that threshold data is met or exceeded. Simulation techniques known in the art may be used to generate and visualize predictive data.

Figure 2E:
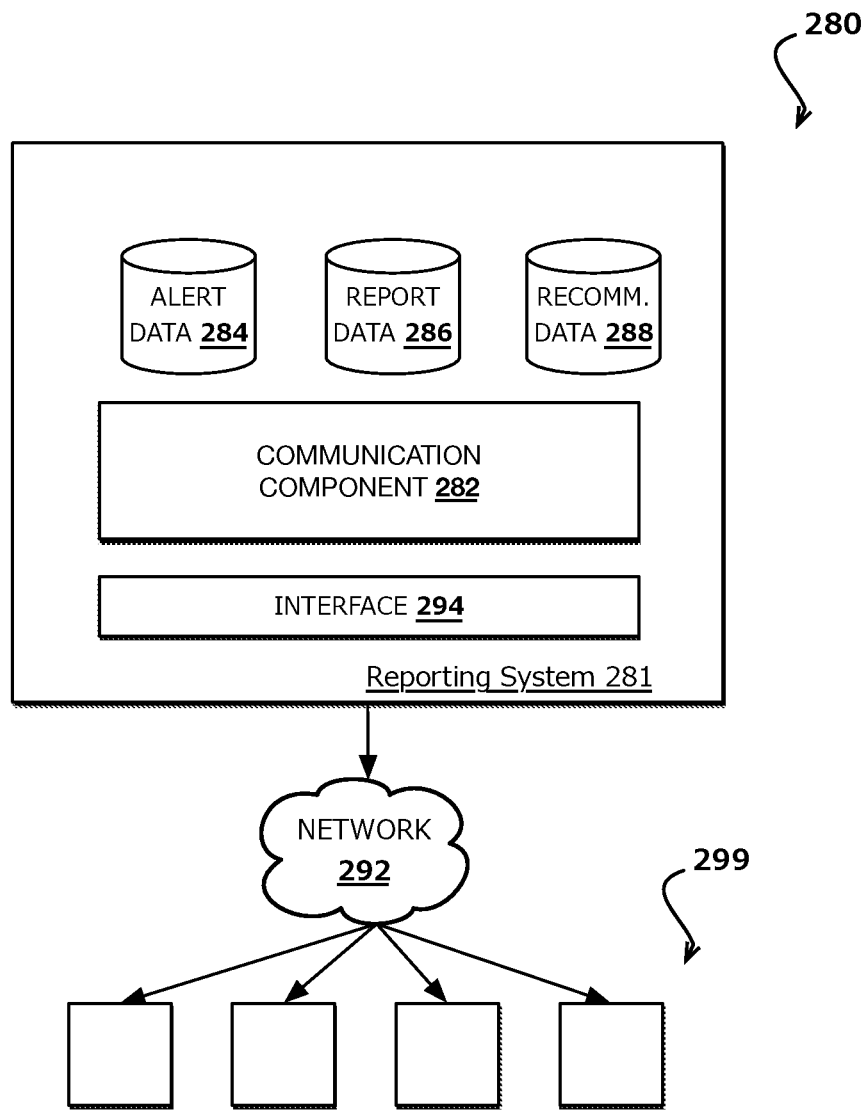

FIG. 2E illustrates example 280 of reporting system 281 in accordance with an embodiment. In this example, reporting system 281 can include communications component 282. Communications component 282 can access alert data store 284, report data store 286, and recommendation data store 288. Interface 294 can include APIs enabling a user or appropriate computing component to output reporting data over at least one network 292 with one or more entities 299, including, for example transportation service providers, event planners, law enforcement, emergency service providers, local authorities, etc. For example, interface 294 can be utilized to provide an interactive map that visualizes possible routing solutions, to aid in selecting among the routing solutions.

In an embodiment, interface 294 can provide an interface to enable a user to submit feedback about the itinerary assignments. Interface 294 may also allow a user to receive reports and alerts. Communications component 282 is operable to process and organize user input and data to be output to the user. User input may include recommendations such as feedback on how to improve the itinerary assignments process. Recommendations are identified by communications component 282 as recommendation data and stored in recommendation data store 288. Data to be output may include reports, for example a visualized map of possible routing solutions, or graphs and tables listing itinerary assignments of a crowd in a location. Reports are identified by communications component 282 as reporting data and stored in report data store 286. Communications component 282 may also send notifications from alert data store 284 to users when, for example, crowd behavior data suggests that thresholds, such as structural occupancy limits, may be exceeded. Reports and alerts may be presented through a graphical user interface or other display.

It should be noted that additional modules, data stores, and/or components can be included embodiments described with respect to FIGS. 2A-2E, and although some of the modules, data stores, and/or components, etc., are illustrated as being separate entities and/or components, the illustrated arrangement is provided as an example arrangement and other arrangements as known to one skilled in the art are contemplated by the embodiments described herein. Further, although the data stores are shown as separate data stores, data from the data stores can be maintained across fewer or additional data stores. As further described herein, the data stores can be maintained locally or remote the components described herein. For example, a third-party can maintain some of the data stores or all of the data stores, among other such options.

FIG. 3 illustrates an example process 300 for providing itinerary assignments (also referred to as scheduling assignments or routing solutions) to facilitate crowd management in accordance with various embodiments. In an embodiment, the process can be conceptualized as one or more processes occurring before, during, and after an event. However, it should be noted that any of the processes may occur in one or more of the example periods of time. For example, analytics and reports may be generated and provided during and after an event. The process for itinerary assignments begins with data collection 302. In an example, data associated with a crowd and the crowd's location may be gathered from a plurality of sources, including itinerary assignments, user preferences such as cultural or religious customs, local laws and regulations, building and structural specifications, transportation sources, video or other media sources, environmental sources such as weather monitors, among others.

During spatial data analysis 304, a path may be divided into segments. The path can be divided in accordance with one or more rules. For example, one or more rules may specify that a segment can be a distance, a city block, a number of buildings, etc. In an embodiment, one or more rules may specify that multiple segments along a path may be of equal distance, equal number of buildings, etc. A rule may specify that the path is divided into segments based on path intersections. The collected data is analyzed with temporal and/or spatial data along each segment. In an example, the collected data, such as itinerary assignments, may provide insight into which destinations and visit times are in demand. When the collected data is combined with information about dimensions, terrain, temporal availability (e.g., authorized times of access, difficult to access at night, etc.) of segments along the path between the destinations, a table relating to the availability and capacity of the segments may be generated. For example, analyzing the collected data with temporal and/or spatial data along a segment may determine that the segment can safely accommodate all, some, or none of the crowd passing through at a given time. Temporal or spatial data may include, for example, distances between destinations in a geographic location, width of a path, terrain quality for walking along a path (e.g., rocky, sandy, steep, etc.), among others.

In scheduling 306, itinerary assignments providing routing solutions to move crowds along a segment are determined based on analysis 308 of the collected data. The itinerary assignments are validated in analysis 308, to determine whether the itinerary assignments need to be rescheduled based on, for example, changes or additions to the collected data. In an example, itinerary assignments are checked against current crowd data, to determine whether the crowds will meet the estimated times in their itinerary assignments. A crowd that follows an original itinerary assignment that is not validated may encounter crowd turbulence, such as crowd congestion or delays in arriving at a destination, due to changes such as sudden extreme weather, participants accidentally taking an incorrect path, road closures, etc. Simulated arrival times or departure times may be calculated based on simulating outcomes from following the original itinerary assignments (e.g., simulating the crowd density, congestion, turbulence, etc. that would result under the original itinerary assignments). The simulated times are compared with the original estimated arrival times or departure times designated in the original itinerary assignments. If the simulated times deviate from the original estimated times by a predetermined range, the itinerary assignments may be invalidated and required to be rescheduled. In an example, itinerary assignments may be invalidated when groups in a crowd are delayed in meeting their itinerary assignment due to rain, crowd congestion along a path, destination closure by local authorities, or making an error in navigation (e.g., taking a wrong turn). Rescheduling itinerary assignments may include updating departure times and paths to mitigate the delay and allow crowd participants to satisfy their itinerary assignments.

In another example, itinerary assignments may be invalidated because simulated times can deviate from original estimated times due to crowd congestion caused by conflicts in directional flow within the crowd (e.g., groups in a crowd may head in different directions as to obstruct another group's path along a segment). Rescheduling itinerary assignments may include updating navigation directions and paths between original locations and destinations, to move all groups within the crowd in a common direction, therefore ensuring paths are unidirectional. Rescheduling itinerary assignments to ensure unidirectional paths enables crowds to, for example, evacuate during emergencies such as fires or other disasters.

Itinerary assignments may be validated by analysis 308 in real-time, where collected data is constantly updated with real-time data, such as streaming video footage of the crowd along the segment. In another embodiment, itinerary assignments may be validated by analysis 308 based on static data, such as a building's structural occupancy threshold and predicting that crowd density would exceed the threshold. Distribution of schedule 310 distributes the itinerary assignments to users. In an example, the itinerary assignments may be distributed to authorized entities, such as group leaders within a crowd.

Rescheduling 312 allows for modifications to the itinerary assignments, based on crowd data from monitoring 314. In an example, monitoring 314 may compare crowd behavior, such as crowd size or pace, at each segment at any given time with environmental data or other data, such as an emergency (e.g., fire, stampede, natural disasters, etc.), crowd size exceeding building capacity thresholds, or groups in a crowd erred in following the scheduled path. Based on the monitoring 314, rescheduling 312 may predict crowd behavior along a segment and determine that the itinerary assignments should be modified to avoid crowd turbulence and ensure crowd safety. Rescheduling 312 may include simulation techniques known in the art to visualize the predicted crowd behavior.

In another example, rescheduling 314 may reconcile conflicting crowd data and itinerary assignments. Monitoring 314 may detect sudden heavy rain which requires evacuation of a location through a main path, but video data may indicate the main path is blocked by mudslide. Mapping data may also indicate an alternative path around the mudslide, and video footage data may verify the terrain in the alternative path is unaffected by the rain and is wide enough to accommodate the number of people in the crowd flowing through at a steady pace. Rescheduling 314 may weigh the factors to determine a modified routing solution for the itinerary assignments that can most safely and efficiently evacuate the crowd from the emergency.

Analytics and reports 316 may send reports or alerts to user about the itinerary assignments, and may receive feedback from users on user experience. In an example, if predicted crowd behavior is determined to exceed thresholds such as maximum capacity in a location, analytics and reports 316 may provide alerts to notify local authorities to take necessary action in the area. When the itinerary assignments are rescheduled due to exceeding thresholds, analytics and reports 316 may also provide alerts to notify users of the updated schedules. Analytics and reports 316 may send reports mapping possible routing solutions or listing the itinerary assignments. In another example, if user submits feedback on user experience with the itinerary assignments, analytics and reports 316 may analyze the feedback as recommendation data on how to improve the system.

In an embodiment, data collection 302, spatial data analysis 304, scheduling 306, analysis 308, and distribution of schedule 310 may be executed prior to the crowd arriving at a segment. In another embodiment, rescheduling 312 may also be executed prior to the crowd arriving at the segment, to modify the itinerary assignments as the itinerary assignments are being planned. In an embodiment, rescheduling 312 and monitoring 314 may be executed during the time the crowd is present at a segment. In an embodiment, analytics and reports 316 may be executed after the crowd has left the segment.

Figure 4A:
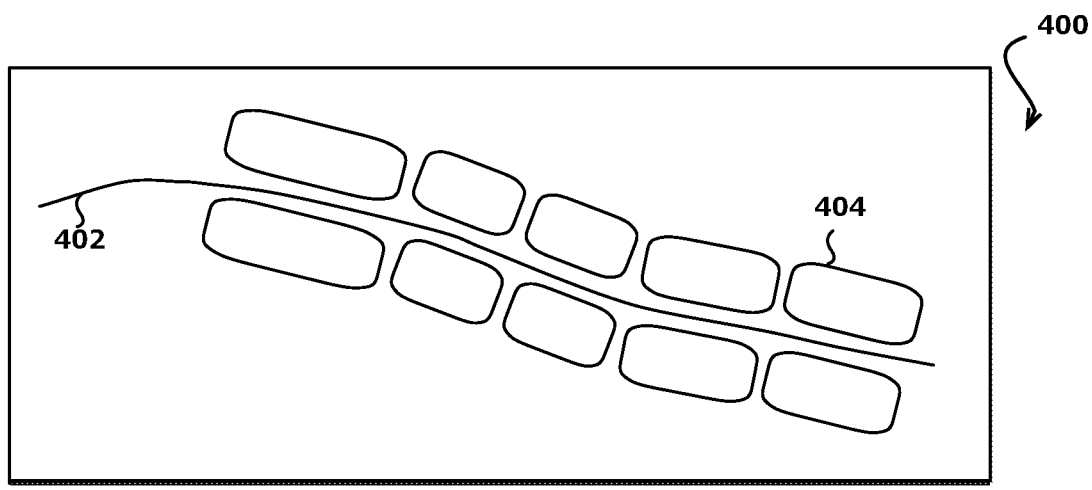
FIGS. 4A, 4B, and 4C illustrate an example geographic area in which crowd movement may be scheduled in accordance with various embodiments.

FIG. 4A illustrates example 400 of a path 402 in a geographic area in which crowd movement may be scheduled. Path 402 may be divided into segments. In certain embodiments, path 402 may be divided into segments based on one or more rules as described herein. Path data, such as path name and length (e.g., distance), is collected. In an example, crowd data at each segment and path data may be analyzed to determine itinerary assignments for the crowd to travel along path 402. In another example, current crowd data at each segment may be analyzed to validate itinerary assignments and to determine whether itinerary assignments should be rescheduled. A stopping point 404 may be located along each segment. In an example, stopping point 404 may be a camp, check-in station, event booth, or any place along a segment where a crowd may visit and crowd data may be gathered. Stopping point 404 can be associated with stopping point data, such as a stopping point name, crowd data, identification information of neighboring paths, distance to neighboring paths, distance to final destination, etc. A path may be associated with a plurality of stopping points. For example, a camp (e.g., a stopping point) may have access to one or more paths. Additionally, one or more camps may have access to the same path.

Figure 4B:
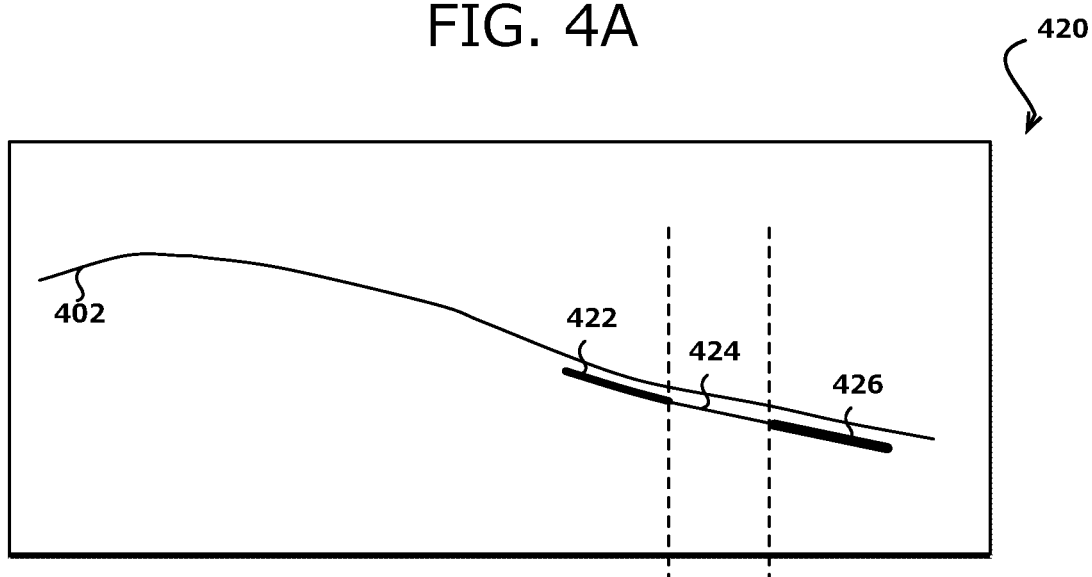

FIG. 4B illustrates example 420 of segments along path 402 in accordance with an embodiment. Path 402 is divided into segments 422, 424, and 426 of equal length. Additionally or alternatively, a segment may be divided if the segment covers an intersection along a road. If a stopping point is located at the endpoint of a segment, the stopping point may be considered to be associated with the segment. At each segment, crowd data may be collected and determined, including the number of people present, the path to which the segment belongs, the segment's distance from a destination, and flow rate of the crowd. In an example, crowd data may be collected along a segment at different points or stopping point (e.g., camp) through a camera, or other media data source device, placed at each stopping point, segment or along one or more locations of the segment. In another example, the camera may be placed at the end of each segment (e.g., at a camp entrance), so that each segment is identical in both length and camera positioning.

In an embodiment, dividing path 402 into segments and analyzing crowd behavior at each segment may be used in prediction analysis to forecast crowd behavior. Prediction of crowd behavior may be determined based on a plurality of factors associated with segments, for example, the current number of people along a path, identifying points along each segment the number of people within a segment, length of each segment, distance of each segment from a destination, average speed of a moving crowd at each segment, among others. Itinerary assignments may be used to determine when and how long a crowd will be present at a segment.

Figure 4C:
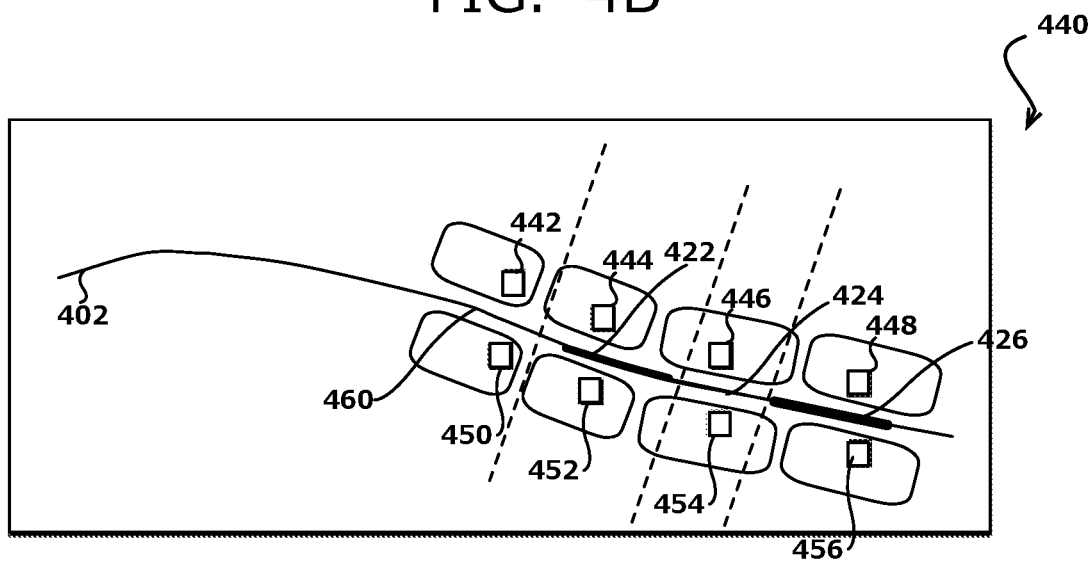

FIG. 4C illustrates example 440 of segments and points along path 402 in accordance with an embodiment. In this example, the flow of a crowd along path 402 can be unidirectional. Also, in this example, the scheduling assignments for at least some people in the crowd can be obtained. Path 402 can be associated with path data or other information that specifies characteristics about the path. As described, path data can include a name that describes a name for the path. The path data can include an identifier such as alpha numeric number or other identifier. The identifier in certain embodiments may be included in the name of the path. The path data may describe a length of the path, a width of the path, geographic coordinates for different locations along the path (e.g., the start, end, and positions along the path), etc. It should be noted the path may be associated with additional path data as would be apparent to one in the art.

Path 402 is divided into segments 422, 424, 426 as illustrated in FIG. 4B. Similar to path 402, individual segments 422, 424, 426 can be associated segment data, including, for example, name, identifier, length, and width information. Additional segment data can include, for example, information identifying the path for which the segment path is associated, information about adjacent paths, information about neighboring points, distance to the end of the segment, etc. Each segment is between a pair of points, each point being located on either side of the path along the segment. In this embodiment, a camera is placed at each point (e.g., 442, 444, 446, 448, 450, 452, 454, 456), so that video footage of crowd data can be collected and monitored from two angles along each segment. The pairing arrangement (e.g., 442 and 450, 444 and 452, 446 and 454, 448 and 456) of cameras at respective segments may improve spatial coverage in the collection of real-time crowd data, and may be useful for simulation and visualization of crowds for prediction analysis in forecasting crowd behavior.

In an embodiment, the video footage can be analyzed to generate predictive data estimating the crowd size at one or more segments of path 402. For example, a camera placed at each point (e.g., 442, 444, 446, 448, 450, 452, 454, 456) can capture image data (e.g., still images and/or video) of the crowd or at least a portion of the crowd from two angles along each segment. The image data can be analyzed using an image processing technique operable to count objects represented in image data to determine the number of people at specific points on the path. For example, cameras may be positioned on gates, posts, buildings, etc. The cameras can be positioned at an entrance to a stopping point, along the path, etc. The image data can be analyzed to count or otherwise determine a number of people at or proximate one or more points or other such locations. In a specific example, scheduling assignments can be analyzed to determine an approximate location and number of people in a crowd for a particular time period. Mapping information can describe the relationship between the paths, segments, and stopping points. For example, mapping information can describe which segments are long which path, and the stopping points leading into the paths and/or segments. Assuming in a last segment, segment$_{(s-1)}$ there are 'X' number of persons. 'C' is the number of stopping points (e.g., camps) associated with a segment 'S' and 'Y' is the number of people scheduled to leave from 'C' stopping points (e.g., camps) in the next 'T' minutes. The total number of people in segment 'S' can be the combination of X (e.g., the number of persons in the last segment) and C (e.g., the number of persons scheduled to leave from the stopping points, e.g., camps).

More generally, 'X' can represent the number of people at a point($t_i$) along segment($t_i$) at time $t_0$ (e.g., time zero). As described, a segment($t_i$) can be positioned between points, and one or more cameras can be placed at the send of a segment.

The distance between point($t_i$) and point($t_{i+1}$) can be represented by 'd'. The average speed of the crowd can be presented by 's'. The time, $t_1$, to reach the end of segment ($t_{i+1}$) can be represented by d/s.

As described, scheduling assignments can specify the movement of a crowd from each point between time interval $t_0$ and $t_1$. 'Y' can represent the number of people scheduled to leave from 'C' camps (e.g., stopping points) in the next 'T' minutes.

The total number of people (e.g., the predicted number of people) in the crowd after time $t_1$ at point($t_{i+1}$) can be the number of people in current segment($t_{i+1}$) and the number of people in the crowd in segment($t_i$).

Thus, the total number of people at or after time $t_1$ can be represented by X+Y. Further, the number of people at point($t_n$) in segment($t_n$) after time $t_n$ can be determined. For example, assume first segment 426 has a first number people (e.g., 535) at a first period of time (e.g., 10:00 am). In this example, the time to reach second segment 424, third segment 422, and fourth segment 460 is determined in accordance with at least embodiments described herein. For this example, the times can be 10 minutes, 20 minutes, and 40 minutes, respectively.

In second segment 424, at a camp, for example, or other stopping point within the second segment, a second group of people are scheduled to leave and travel toward third segment 422 within a period of time. For example, a group of 50 people are scheduled to leave the second segment in approximately 5 minutes and travel towards the third segment (422). In this example, the predicted number of people after 10 minutes (e.g., 10:10) is 585 (535+50) people. That is, the total number of people in the crowd after time $t_1$ (e.g., 10 minutes) at point($t_2$) (e.g., second segment 424) can be the number of people in current segment($t_2$) (e.g., 50 in second segment 424) and the number of people in the crowd in segment($t_1$) (e.g., 535 in first segment 426). Said another way, the predicted number of people at $t_{(n+1)}$ is X+Y+$Y_1$, where $Y_1$ is the scheduled number of people in the second segment.

In third segment 422, a third group of people are scheduled to leave and travel toward fourth segment 460 within a period of time. For example, a group of 80 people are scheduled to leave third segment 422 in approximately 5 minutes and travel towards fourth segment 460. In this example, the predicted number of people after 20 minutes (from time zero) at 10:20 am is 665 people. That is, the total number of people in the crowd after time $t_2$ (e.g., 20 minutes) at point($t_3$) (e.g., third segment) can be the number of people in current segment($t_3$) (e.g., 80 in third segment 422) and the number of people in the crowd in segment($t_2$) (e.g., 535 in second segment 424). Said another way, the predicted number of people at $t_{(n+2)}$ is X+Y+$Y_1$+$Y_2$, where $Y_2$ is the scheduled number of people in third segment 422.

In the fourth segment (460), a fourth group of people are scheduled to leave within a period of time. For example, a group of 150 people are scheduled to leave the fourth segment in approximately 10 minutes and travel from the fourth segment. In this example, the predicted number of people after 40 minutes (from time zero) at 10:40 am is 815 people. That is, the total number of people in the crowd after time $t_3$ (e.g., 40 minutes) at point($t_4$) (e.g., fourth segment 460) can be the number of people in current segment($t_4$) (e.g., 150 in fourth segment 460) and the number of people in the crowd in segment($t_3$) (e.g., 535 in third segment 422).

In an example, estimating or predicting the flow rate of people can include, for example, as the number of people passing a camera within a time period. In an embodiment, the flow rate may also be determined by analyzing first image data of a crowd of people at a first destination (e.g., stopping point) along a multi-segment path to determine a first number of people. As described, analyzing image data can include using one or more image processing techniques such as an image counting technique to count a number of objects (e.g., people) represented in image data.

The process can then analyze second image data at a second destination (e.g., stopping point) along the multi-segment path to determine a second number of people.

Determining an average speed associated with the second number of people, or at least a subset of the number of people, can be based on a distance between the first destination and the second destination, and a first amount of time between obtaining the first image data and obtaining the second image data. For example, the average speed can be the ratio of the distance traveled by at least the subset of the second number of people and the time for the people to travel from the first destination to the second destination. In an embodiment, the time can be determined from timestamp information obtained from image data or another approach. For example, timestamp information associated with image data obtained from the first destination can be compared to timestamp information obtained from the second destination. In this example, the time to travel from the first destination to the second destination can be the difference between the determined times.

The process can then determine a flow rate of people as the number of people per the distance d per a time period. Thus, the flow rate is the number of people per distance per time. In this example, the flow rate is based on the multi-segment path length, the first number of people, the second number of people, and the average speed. The distance can be obtained. As described, each segment can be associated with a length. In certain embodiments, the distance can be obtained from mapping or navigation software, etc. The number of people can be the difference between the second number of people and the first number of people. The average speed can be determined as described above. The flow rate can be the product of the number of people, the segment length, and the period of time.

Figure 5:
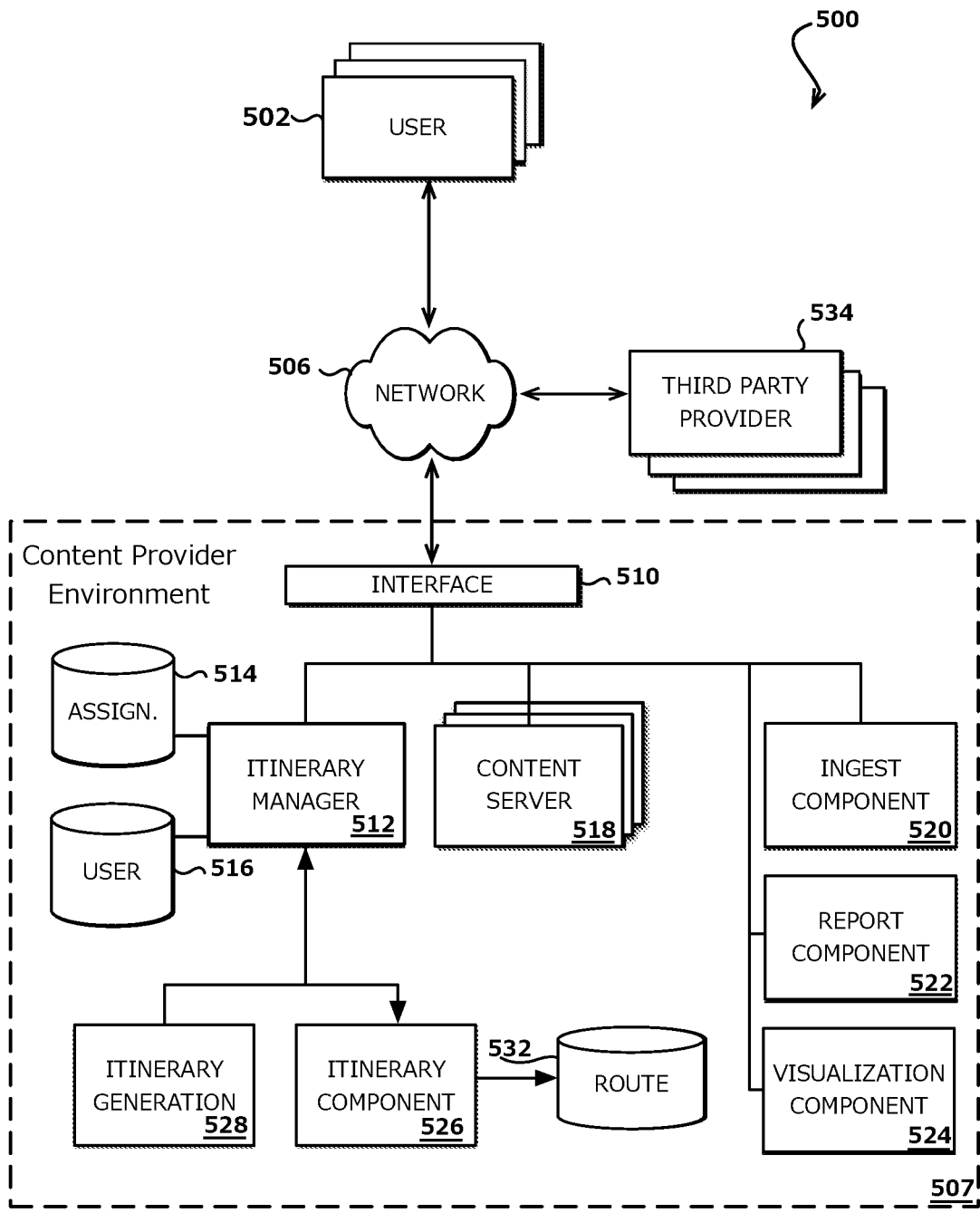
FIG. 5 illustrates an example environment in which aspects of the various embodiments can be implemented.

FIG. 5 illustrates an example environment 500 in which aspects of the various embodiments can be implemented. In this example, users can utilize an application or interface, such as a browser, executing on user device 502 to communicate with a crowd management or routing solutions service over at least one network 506. The user device 502 can be any appropriate computing device capable of requesting, receiving, and/or presenting content, such as may include a desktop computer, a thin client device or "dummy terminal," a smartphone, an e-book reader, a tablet computer, a notebook computer, a personal data assistant, a video gaming console or controller, a smart television, a wearable computer (e.g., a smartwatch or glasses), or a portable media player, among others.

User device 502 is in communication with a resource provider 507 via the at least one network 506. The at least one network can include a wired and/or wireless network, as may include the Internet, a cellular network, a local area network (LAN), an Ethernet, an Intranet, and the like. The user device 502 may have varied local computing resources, such as may include central processing units and architectures, memory, mass storage, graphics processing units, communication network availability and bandwidth, etc.

Resource provider 507 can provide crowd management services. These services can include, for example, scheduling services, transportation services, travel services, navigation services, event management services, security services, law enforcement services, emergency services, among other such services where scheduling the movement of people can be considered. In certain embodiments, provider 507 can be an intermediary between a customer and a company, such as third-party provider 534. For example, third-party provider 534 can utilize resource provider 507 to provide crowd management services, such as predicting crowd behavior in response to environmental conditions such as rain, determining routing solutions to move crowds safely through an area while complying with government regulations of restricted access areas, determining the number of people expected to arrive at a specific location and the length of time they are expected to visit the location, and other services described herein.

Itinerary assignment information can be received to an interface and/or networking layer 510 of the resource provider 507. The interface and/or networking layer can include any of a number of components known or used for such purposes, as may include one or more routers, switches, load balancers, Web servers, application programming interfaces (APIs), and the like.

The itinerary assignment information can be stored in assignment data store 514 as well as information associated with the user in user data store 516 until such information is ready to be processed. Other information may be obtained including, for example, environmental data such as weather, temperature, and terrain quality of a destination listed in the itinerary assignment. For example, ingest component 520 can receive a selection of sources for one or more geographic locations for a large gathering of people. The sources can include, for example, user input, video/image devices, local authorities, weather monitors, and structural inspection reports. Examples of user input may include individual participants' itinerary assignments specifying their desired destinations and visit times, or user preferences or characteristics influencing the itineraries, such as cultural or religious customs. For example, during the annual Hajj pilgrimage, user preferences or characteristics may include a participant's school of Islamic jurisprudence, which establishes guidelines for which destinations and visit times within Mecca should be included in the itinerary assignment. In certain embodiments, a configuration file or other instructions can be obtained that specifies one or more geographic locations and/or crowds.

Once the sources are identified, a variety of methodologies may be used to retrieve the relevant crowd data, including but not limited to, data scrapes, API access, etc. Ingest component 520 processes and stores the crowd data into the appropriate database based on the data's source. The crowd data can include, for example media source data (e.g., images of a crowd in a geographic location showing crowd density, video footage of crowd directional flow and pace along a path), user's itinerary assignment listing desired or prescribed destinations and visit times, user characteristics data (e.g., user's cultural or religious customs which guide or restrict the itinerary assignment), compliance data (e.g., a list of restricted access areas regulated by local authorities), environment data (e.g., weather forecasts in the crowd's location from weather monitors), etc.

Itinerary manager 512 manages itinerary assignments of the crowd and generates scheduling assignments that optimize the crowd's success or efficiency of fulfilling their itinerary assignments. Itinerary manager 512 identifies and stores itinerary assignments data in assignment data store 514 and related user information, such as a user's cultural or religious customs, in user data store 516. Itinerary optimization processes data from assignment data store 514 and user data store 516 to determine routing solutions that optimize, for example, movement of crowds through destinations, crowd flow and pace through paths, and avoid crowd turbulence or dangerous environmental conditions. Routing solutions are stored in route data store 532. Itinerary generation 528 generates scheduling assignments based on the routing solutions. In an embodiment, itinerary optimization 526 may validate the scheduling assignments to determine that the scheduling assignments should be modified to accommodate, for example, newly collected data indicating sudden heavy rain or closure of a path. Itinerary optimization 526 may update the routing solution, and itinerary generation 528 may generate a modified scheduling assignment. Scheduling assignments are presented to the user via content server 518 or another appropriate component.

Visualization component 524 is operable to visualize crowd behavior data through visual output and allow a user to view and interact with the visualization. In this example, the visualization may include maps, graphs, tables, among others, and crowd behavior data may be color-coded. Visualization component 524 may provide interactive graphical user interface tools for the user to apply filters to the visual output and view information such as building capacity, accessibility of roads, the capacity of roads. A user may also review crowd behavior in a given area, such as current crowd size, density, pace, or direction along a path. Visualization component 524 may provide interactive graphical user interface tools for a user to submit rescheduling requests to update his or her itinerary assignment, for example, based on user preferences such as safety (e.g., the capacity of the road) and temporal preferences (e.g., desired time to visit a location). Visualizations may be presented to the user via content server 518 or another appropriate component.

Report component 522 is operable to send reports or alerts to users. Networking layer 510 can include APIs enabling a user or appropriate computing component to output reporting data or alert notifications over at least one network 506 with one or more third-party providers 534, including, for example, transportation service providers, event planners, law enforcement, emergency service providers, local authorities, etc. Reports may include, for example, a visualized map of possible routing solutions, or graphs and tables listing itinerary assignments of a crowd in a location. Alerts may be sent to, for example, notify users when crowd behavior data suggests that thresholds, such as structural occupancy limits, may be exceeded. In an embodiment, report component 522 may accept feedback from users on user experience. Reports and alerts may be presented to the user via content server 518 or another appropriate component.

In accordance with various embodiments, additional or alternative components and elements can be used in such a system in accordance with the various embodiments. Accordingly, it should be noted that additional services, providers, and/or components can be included in such a system, and although some of the services, providers, components, etc., are illustrated as being separate entities and/or components, the illustrated arrangement is provided as an example arrangement and other arrangements as known to one skilled in the art are contemplated by the embodiments described herein. In accordance with various embodiments, the various components described herein may be performed by any number of server computing devices, desktop computing devices, mainframe computers, and the like. Individual devices may implement one of the components of the system. In some embodiments, the system can include several devices physically or logically grouped to implement one of the modules or components of the system. For example, the system can include various modules and components combined on a single device, multiple instances of a single module or component, etc. In one specific, non-limiting embodiment, itinerary manager 512, itinerary generation 528, and itinerary optimization 526 can execute on one device and visualization component 524 and report component 522 can execute on another device, and ingest component 520 can execute on yet another device. In another embodiment, the components can execute on the same device or other combination of devices.

In some embodiments, the features and services provided by the system may be implemented as web services consumable via a communication network. In further embodiments, the system is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 6A:
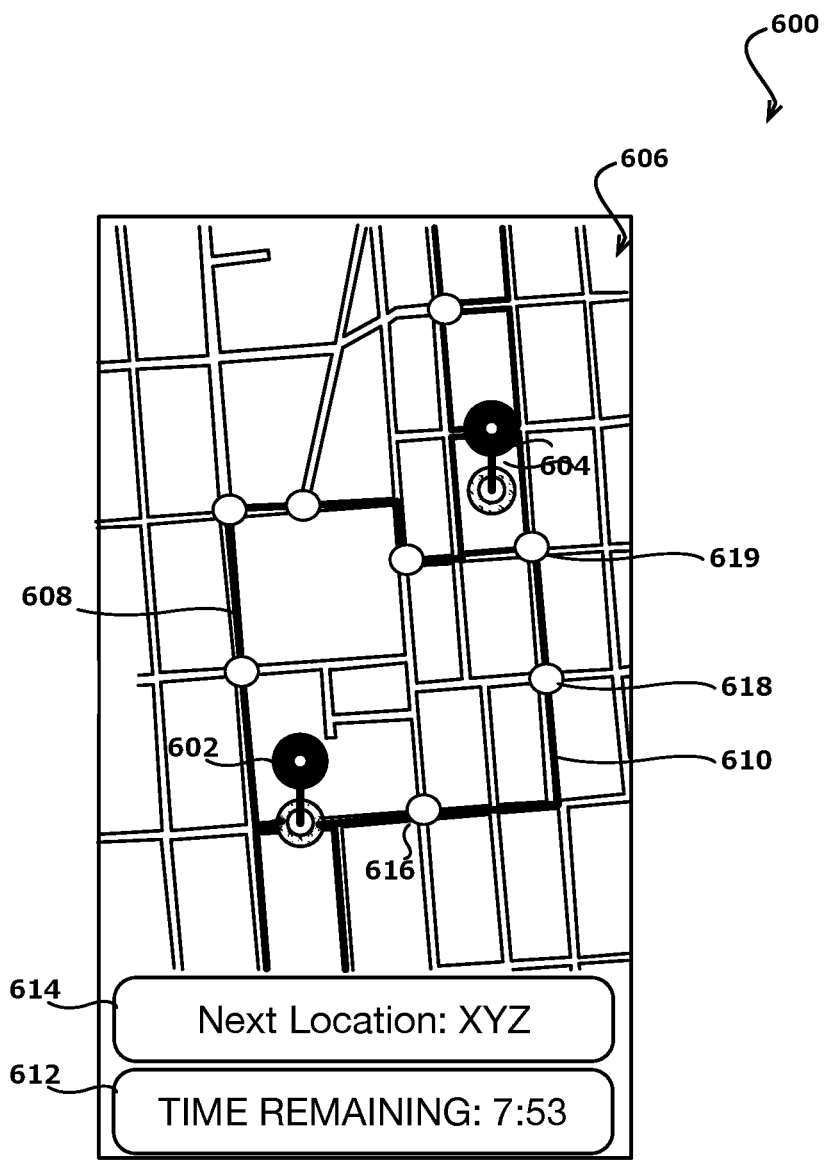
FIGS. 6A and 6B illustrate an example where a user is attempting to navigate an event through a crowd in accordance with various embodiments.

FIG. 6A illustrates an example situation 600 of a user navigating in a crowd in accordance with various embodiments. Although a portable computing device (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others.

In this example, the user receives directions along a routing solution provided in an itinerary assignment. In an embodiment, the user's current location 602 and destination 604 are marked on an interactive map 606, and a plurality of alternative routes 608, 610 between the locations is highlighted or color coded. The user's destination 604 is displayed as well as the time remaining 612 to arrive at destination 614 and satisfy the user's itinerary assignment. In certain embodiments, the time remaining may be the time remaining to arrive at stop along a path. For example, route 608 may include stops 616, 618, and 619. Time remaining 612 may reflect the time remaining to arrive at stop 616 from current location 602. Current crowd behavior data, such as crowd density and pace along a path may be visualized in the map. For example, crowd density can be illustrated using one or more colored lines. The direction of crowd flow may also be visualized on the map. For example, arrows or other visual indicators may be used to illustrate the direction of crowd flow. In short, paths may be color coded to indicate congestion, crowd flow direction, road accessibility, etc.

Figure 6B:
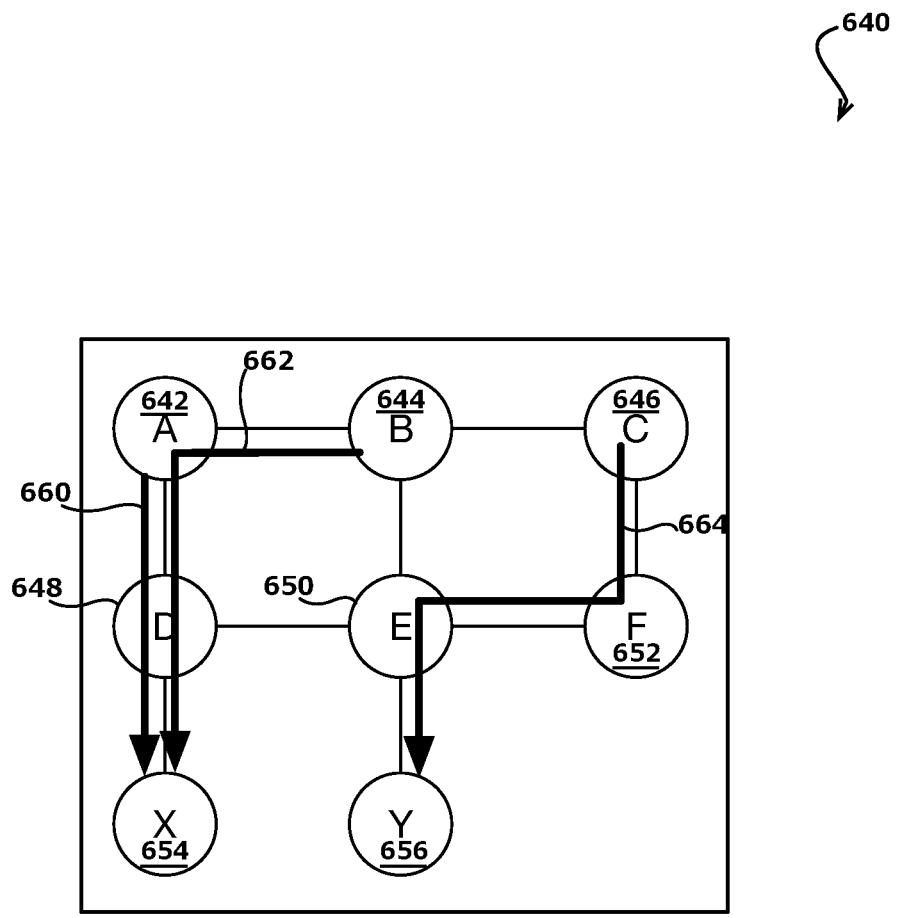

In an embodiment, crowd flow along each path can be unidirectional. For example, as illustrated in example 640 of FIG. 6B, crowd movements from a source location 642 (also referred to as an original location) to a destination 654, or from a destination 654 to a source location 642, are unidirectional. A routing algorithm checks for conflicts in directional flow (e.g., crisscross) while users are moving between locations along a path 660 from stops 642 to 654, having a sequence of stops 642, 648, and 654. If crisscross is detected within a segment along the path 660 from stops 642 to 654 (e.g., simultaneous movement southbound from stop 642 toward stop 648, and northbound from stop 648 toward stop 642), the routing algorithm updates the users' itinerary assignments, such as navigation directions, to ensure users are now moving unidirectionally (southbound from 642 toward 648 only) along the path 660. Movement remains unidirectional even when multiple paths pass through a particular spot (share segments). For example, a path 662 between 644 and 654 shares segments (segment 642, 648) with the path 660 between 642 and 654. In shared segments where path 660 overlaps with path 662, movement in path 660 along the shared segment 642, 648 must parallel movement in path 662 along that segment 642, 648. In this example, because the routing algorithm sets the movement along path 660 (stop 642 through stop 654) as heading south from stops 642 to 648 to 654, any movement along segment 642, 648 must remain south. Therefore, users present at stop 642 cannot head toward any stop (e.g., stop 644), other than toward 648. Users along segment 642 and 644 (on path 662) may therefore only head west from stop 644 toward stop 642. So, movement from path 662 must follow the directional sequence from stops 644, 642, 648, and 654.

In embodiment, movement between intermediate stops 652 and 650 along a path 664 (from stops 646 to 656) parallels the overall movement between stops 646 and 656. This ensures unidirectional movement along the path 664, even if a user's route toward destination 656 begins at a source location of an intermediate stop 652 or 650, instead of at stop 646.

Figure 7:
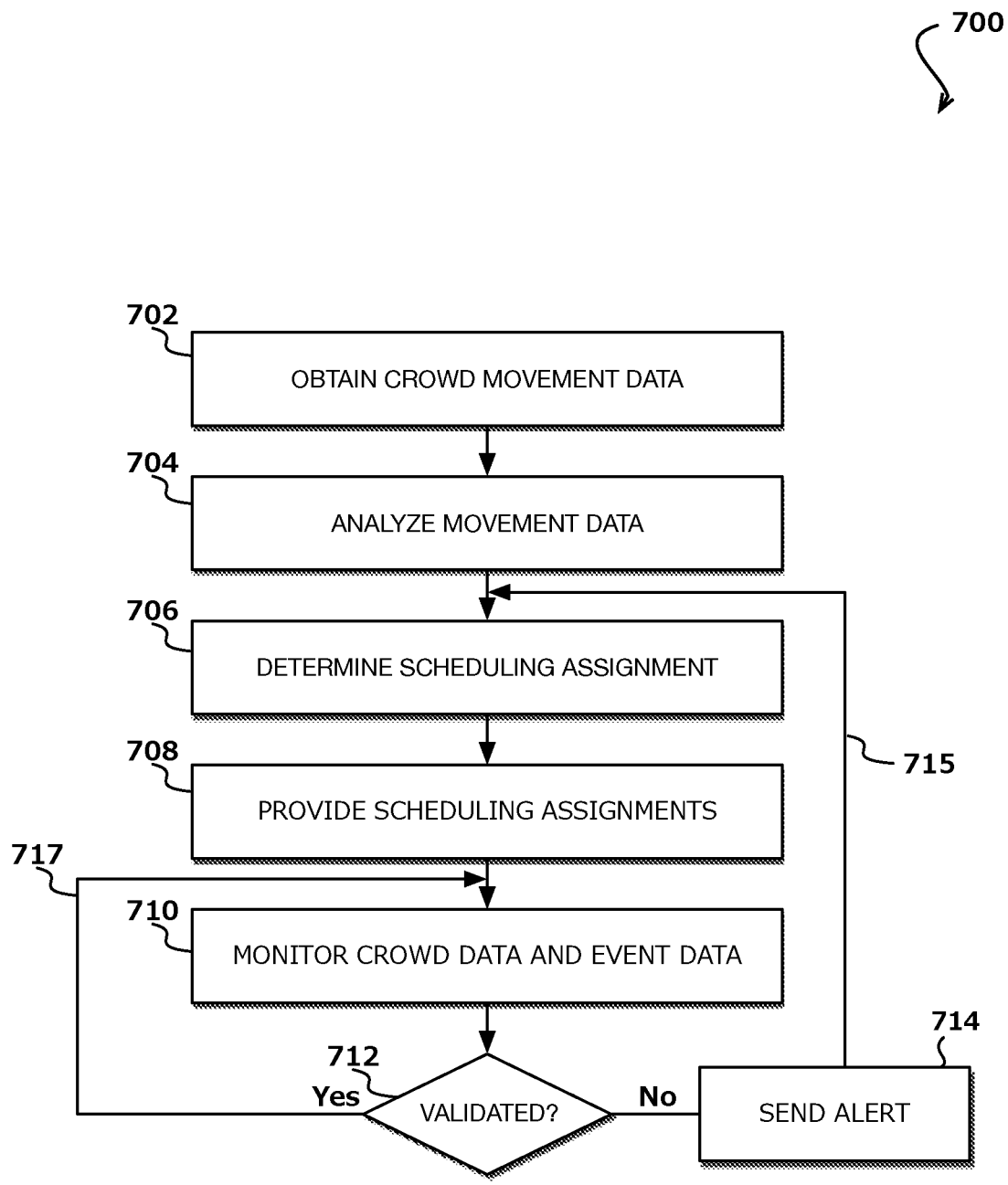
FIG. 7 illustrates an example process for scheduling crowd movement in accordance with various embodiments.

FIG. 7 illustrates an example process 700 for scheduling crowd movement in accordance with various embodiments. It should be understood that, for any process discussed herein, there can be additional, fewer, or alternative steps, performed in similar or different orders, or in parallel, within the scope of the various embodiments unless otherwise stated. In this example, crowd movement data can be obtained 702. Crowd movement data can include, for example, itinerary assignments, crowd data, and event data. Crowd data and event data may be gathered from a plurality of sources, including user preferences such as cultural or religious customs, local laws and regulations, building and structural specifications, transportation sources, video or other media sources, environmental sources such as weather monitors, among others. The crowd movement data can be analyzed 704 to determine 706 scheduling assignments. The scheduling assignments can be provided 708 to the appropriate person and can then be used to move crowds along a multi-segment path. Crowd data and event data continue to be monitored 710, and can be used to validate 712 against the scheduling assignments. In an example, if it is determined that the itinerary assignment is invalidated, because it is predicted that crowd congestion or sudden heavy rain will occur, an alert can be generated and sent 714 to the user of schedule changes. The itinerary assignment can then be modified (e.g., rescheduled) 715 to divert the crowd away from flooded areas. If it is determined that the itinerary assignment is validated, then the crowd data and event data is continually monitored 717.

Figure 8:
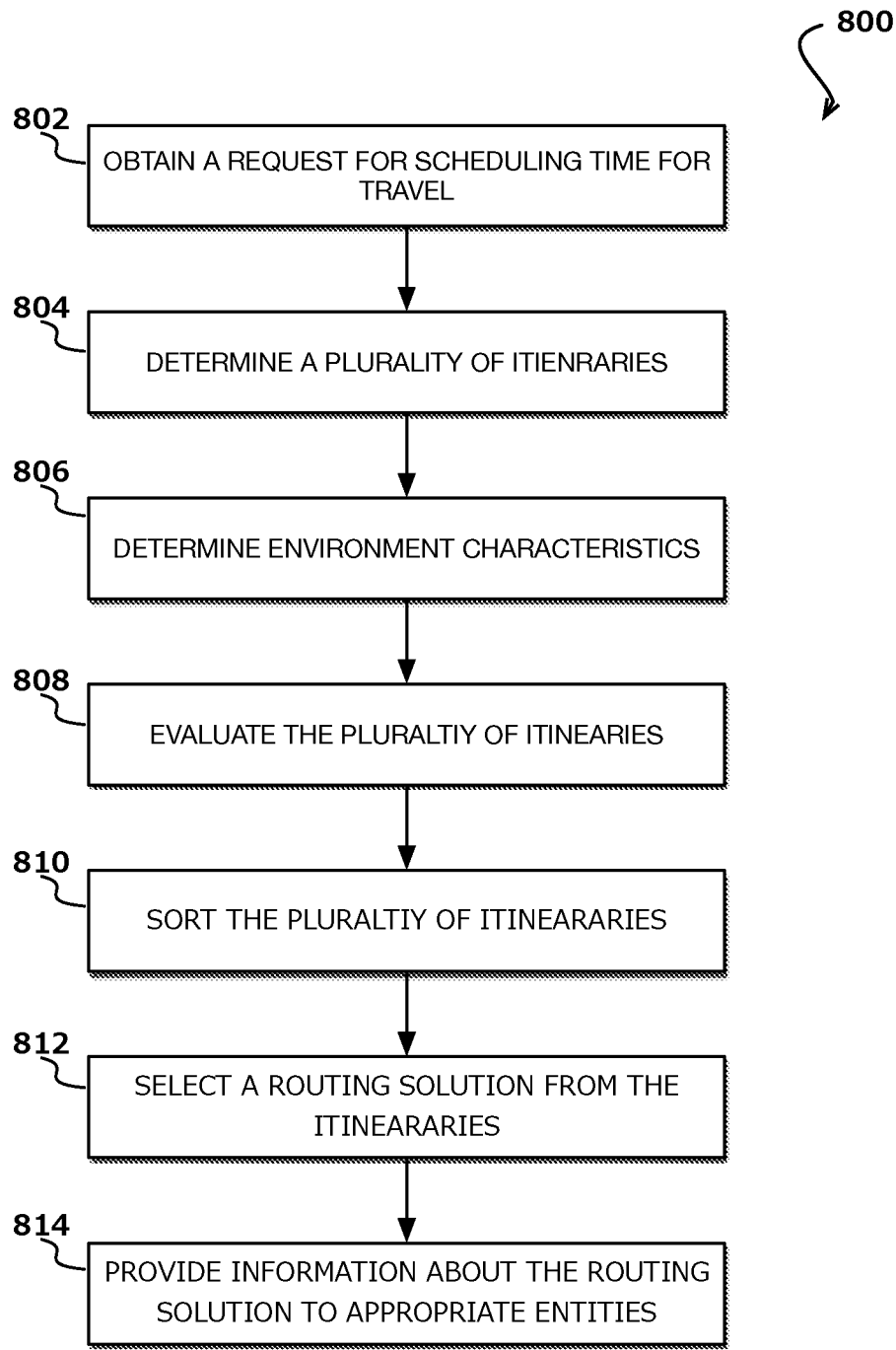
FIG. 8 illustrates an example process for scheduling crowd movement in accordance with an alternate embodiment.

FIG. 8 illustrates an example process 800 for scheduling crowd movement in accordance with an alternate embodiment. In this example, a request for scheduling time for travel between a plurality of destinations along a multi-segment path for a plurality of participants is obtained 802. A multi-segment path can include, for example, a path having an origin, a destination, and one or more stops between the origin and the destination. The plurality of participants can be divided into groups and the groups may have different starting origins and different destinations.

A plurality of itineraries for the request is determined 804 as well as respective itinerary characteristics for the plurality of itineraries. An itinerary may be associated with an individual participant or a group of participants. Further, an itinerary may specify a participant's (or group of participants) origin, desired destinations, and visit times for one or more of the destinations. In an embodiment, the itinerary characteristics can be associated with event compliance metrics (e.g., event start and stop requirements), accessibility metrics (capacity of roads and buildings, movement accommodations and/or restrictions), security metrics, and the like.

Environmental characteristics for the plurality of itineraries are determined 806. Environmental characteristics can include, for example, current and predicted weather conditions, an accessibility characteristic for destinations along the multi-segment path, road conditions, or capacity constraints of at least one of roads or buildings along the multi-segment path. Accordingly, in various embodiments, an itinerary may be associated with a set of components. For example, an itinerary may be associated with itinerary characteristics, environmental characteristics, and the characteristics may be associated with sub components.

The plurality of itineraries can be evaluated 808 based on the respective itinerary characteristics and the environmental characteristics to generate itinerary scores. In an embodiment, this may include determining that the at least one of the plurality of itineraries includes a waiting segment with a waiting time of day and waiting location, determining an amount of climate exposure based on a predicted weather for the waiting time of day and waiting location; determining that a walking segment of the at least one of the plurality of itineraries includes at least one of stairs, a steep slope, or a specified elevation change; determining user preference information, the user preference information including religious preference information environmental characteristic preference.

In an embodiment, values for individual itinerary characteristics and environment characteristics can be determined and the values can be combined to generate an itinerary score. For example, values can be determined for each component and/or subcomponent. In a specific example, a value can be determined for weather impact (i.e., a subcomponent of an environmental component), length of travel impact, difficulty of terrain impact, etc., for each path. More specifically, in accordance with an embodiment, a value from a predetermined range of values (e.g., 0-1, 0-100, etc.) can be determined for individual characteristics and components based on the impact by a characteristic. In an embodiment, values can be organized according to sets of thresholds. For example, in the situation of a weather characteristic, weather impact can be based on temperature ranges. For example, a temperature within a particular range can be associated with a value for that range. In accordance with various embodiments, the thresholds can be dynamic in that they be updated. For example, the thresholds can be updated periodically, based on an interval, in response to an event, etc. The itinerary score in certain embodiments may be for a segment along the multi-segment path or may represent a combined score for segments along the path. For example, in the above-referenced example, a value can be determined for the weather impact, the length of travel impact, the difficulty of terrain impact, for each segment. In the situation the score is a combined score for the segments along the path, the score can be a weighted combination, an average, etc. of the scores for the individual segments. The itinerary score may be a score for an individual participant or a group of participants. In the situation the itinerary score is for a group of participants comprised of a plurality of individual participants, the itinerary score can be a combination (e.g., weighted, average, etc.) of itinerary scores for the plurality of individual participants. In various embodiments, the itinerary scores can include a vector of scores. In certain embodiments, a score is associated with a segment or a combination of segments. It should be noted that any number of scoring mechanisms may be implemented, such as a scoring mechanism configured to maximize or minimize an itinerary.

The plurality of itineraries can be sorted 810 based on the respective itinerary scores to generate a sorted list. For example, the plurality of itineraries can be sorted based on a highest or lowest score itinerary, depending of the scoring and selection preference. A routing solution for individual groups from the sorted list can be selected 812. In an embodiment, individual routing solutions specify an amount of time to spend at the plurality of destinations and a departure time from an origination location. As described, the routing solutions can mitigate crowd congestion, avoid conflicts in directional flow within a crowd, divert crowds from dangerous weather, meet parameters of people's itineraries, accommodate changes in people's itineraries, and the like.

Thereafter, information about the individual routing solutions can be provided 814 to appropriate entities. For example, information for the individual routing solutions can be provided for display, where the information including at least time and location information for segments of the multi-segment path. In various embodiments, the routing solutions may be iteratively modified based on the environmental characteristics or the itinerary characteristics to satisfy at least a segment of the multi-segment path. The routing solution in certain embodiments described herein can include a simulated routing solution for a future period of time under predicted conditions.

Figure 9:
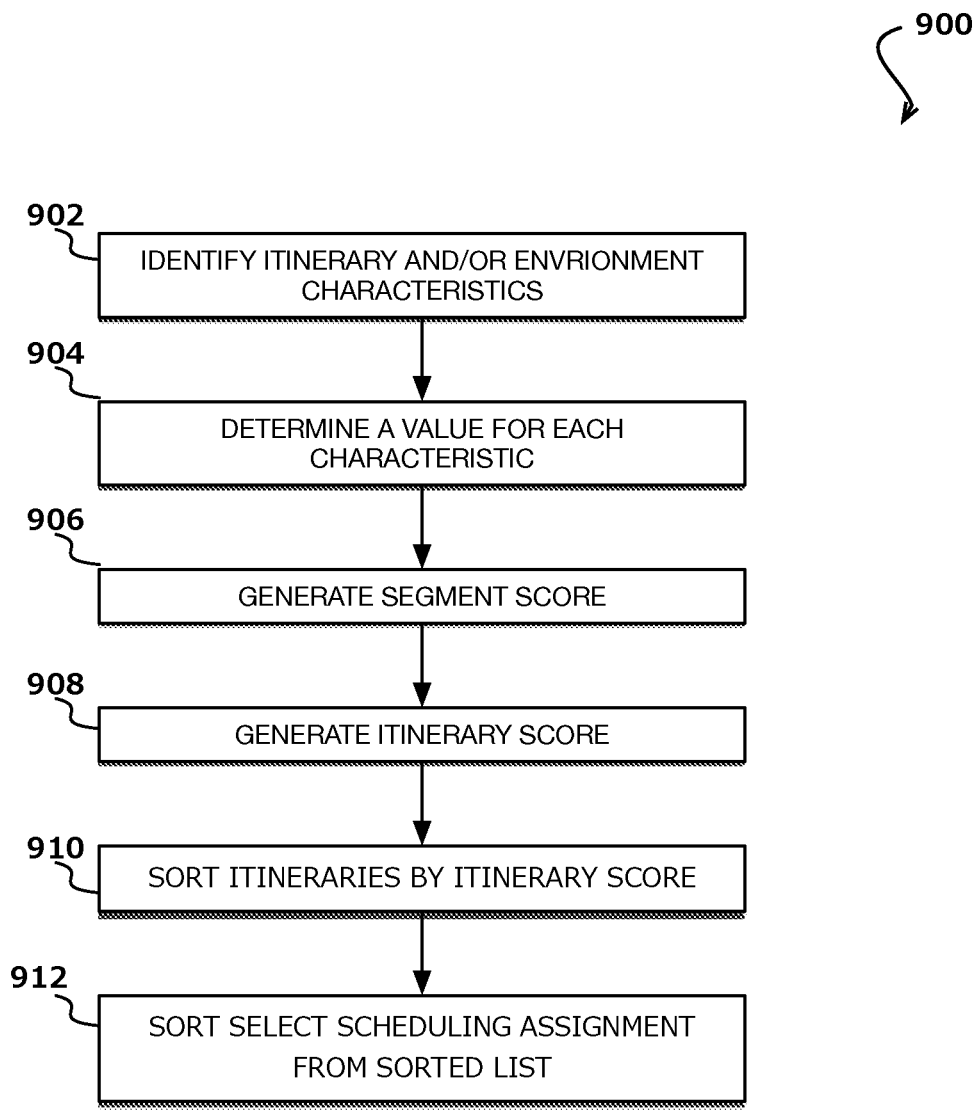
FIG. 9 illustrates an example process for determining scheduling assignments in accordance with various embodiments.

FIG. 9 illustrates an example process 900 for determining scheduling assignments (also referred to as itinerary assignments or routing solutions) in accordance with various embodiments. In this example, itinerary characteristics and environment characteristics associated with a plurality of itineraries submitted in a request for a scheduling assignment are identified and categorized 902. An itinerary may be associated with an individual participant or a group of participants. The itinerary may specify the participant's origin, desired destinations, and visit times for one or more destinations. Itinerary characteristics can be associated with event compliance metrics (e.g., event start and stop requirements), accessibility metrics (capacity of roads and buildings, movement accommodations and/or restrictions), security metrics, etc. In an embodiment, a scheduling assignment may include a recommended time for travel between a plurality of destinations along a multi-segment path. A multi-segment path may include, for example, a path having an origin, a destination, and one or more stops between the origin and the destination. Environment characteristics can include, for example, current and predicted weather conditions, an accessibility characteristic for destinations along the multi-segment path, road conditions, or capacity constraints of at least one of the roads or buildings along the multi-segment path.

In an embodiment, the itinerary characteristics and/or environment characteristics are identified and categorized as 902. A value for each individual itinerary characteristic and/or environment characteristic is determined 904. For example, a value can be determined for weather impact, length of travel impact, difficulty of terrain impact, etc., for each path. In accordance with an embodiment, a value from a predetermined range of values (e.g., 0-1, 0-100, etc.) can be determined for a characteristic based on the impact by a characteristic. In an embodiment, values can be organized according to sets of thresholds. For example, in the situation of a weather characteristic, weather impact may be based on temperature ranges. A temperature within a particular range can be associated with a value for that range. In accordance with various embodiments, the thresholds can be updated (dynamic). For example, the thresholds can be updated periodically, based on an interval, in response to an event, etc.

In an embodiment, values determined for individual itinerary characteristics and/or environment characteristics can be combined to generate a segment score 906 to represent a particular segment along the multi-segment path. The combined values may be weighted, averaged, etc. In an example, a segment score that falls within a predetermined range of segment scores may reflect the current environment condition (e.g., weather, terrain, etc.) of and/or itinerary demands (e.g., participants' desired destinations from the participant's source location require traveling through the particular segment) for use of the segment. In another embodiment, the values may be combined to generate a score for the entire multi-segment path.

The segment scores of the segments along the multi-segment path are combined to generate an itinerary score 908. The itinerary score may be a weighted combination, an average, etc. of the segment scores. In another example, the itinerary score may be a combination of segment scores of a subgroup of segments along the multi-segment path, for example, most used segments, segments with a specific terrain, segments having required closure times, etc. The itinerary score may be a score for an individual participant or a group of participants. In the situation of the itinerary score is for a group of participants comprised on a plurality of individual participants, the itinerary score can be a combination (e.g., weighted, average, etc.) of itinerary scores for the plurality of individual participants. In various embodiments, the itinerary scores can include a vector of scores. It should be noted that any number of scoring mechanisms may be implemented, such as a scoring mechanism configured to maximize or minimize an itinerary.

The plurality of itineraries can be sorted 910 into a sorted list, based on their respective itinerary scores. For example, itinerary scores may be ranked from highest or lowest itinerary score, depending of the scoring and selection preference. In another example, itinerary scores may be sorted by whether the scores are within a predetermined range of scores, or exceeds or falls below the range.

A scheduling assignment (also referred to as a routing solution) can be selected from the sorted list 912. The scheduling assignment may be selected for an individual participant or a group of participants. As described, a scheduling assignment can specify an amount of time to spend at the plurality of destinations and a departure time from a source location. The scheduling assignments can mitigate crowd congestion, avoid conflicts in directional flow within a crowd, divert crowds from dangerous weather, meet parameters of participants' itineraries, accommodate changes in the participants' itineraries, and the like. The scheduling assignments can be provided to appropriate entities, and can be visualized through an interactive visual display.

In the example, when updated itinerary characteristics and/or environment characteristics are collected, such as a sudden change in weather or delay in crowd arrival times, the value of the characteristic is updated. The updated characteristic value may be used to update the segment score, and the updated segment score is used to update the itinerary score. The changed itinerary score may reposition the associated itinerary up or down the sorted list, and a new (modified) scheduling assignment is selected from the modified sorted list.

Figure 10:
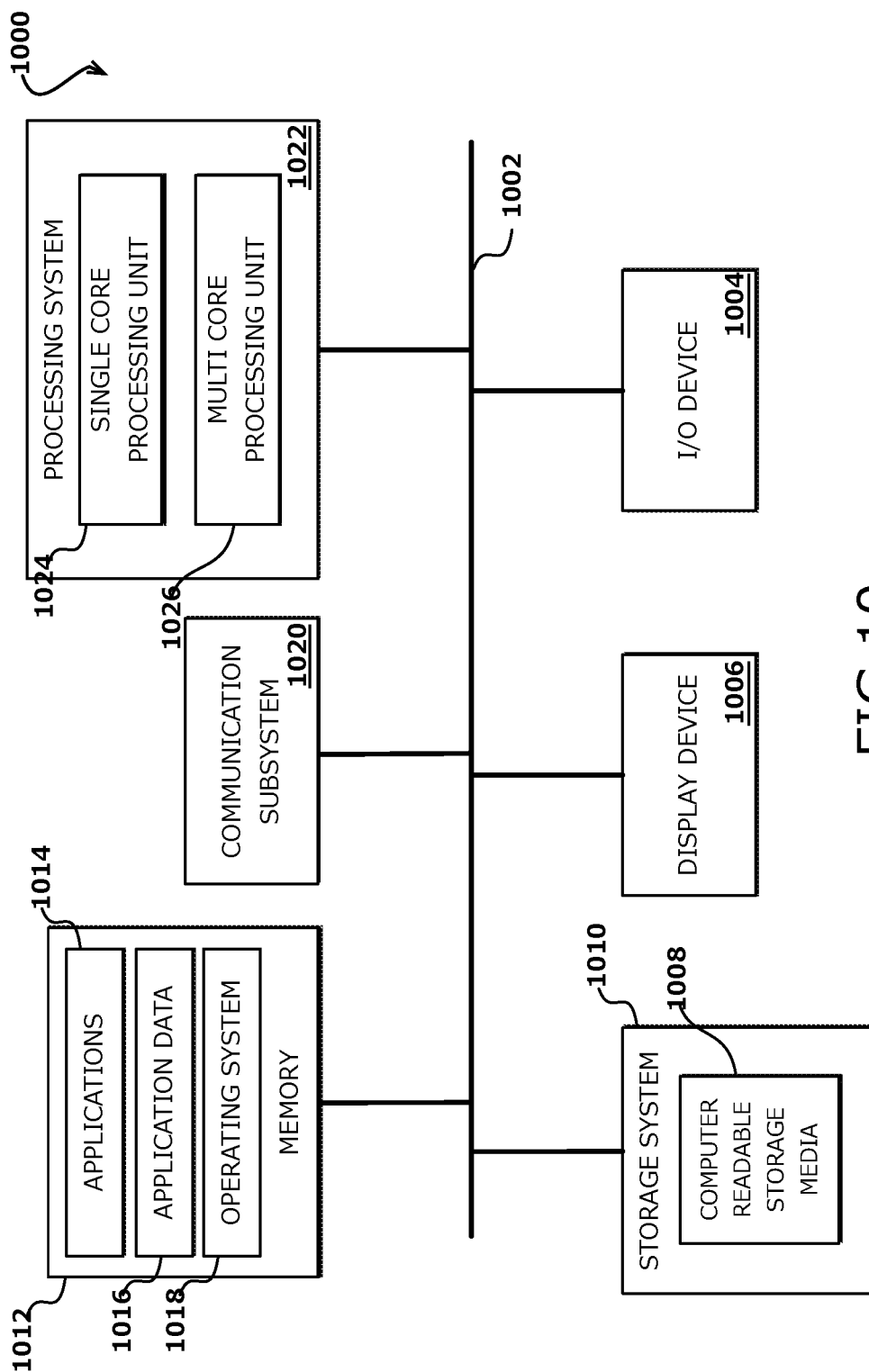
FIG. 10 illustrates an example configuration of components of a device.

FIG. 10 illustrates a set of basic components of an electronic computing device 1000. In various embodiments, computer device 1000 may be used to implement any of the systems, devices, or methods described herein. In some embodiments, computer device 1000 may correspond to any of the various devices described herein, including, but not limited, to mobile devices, tablet computing devices, wearable devices, personal or laptop computers, vehicle-based computing devices, or other devices or systems described herein. As shown in FIG. 10, computer device 1000 can include various subsystems connected by a bus 1002. The subsystems may include an I/O device subsystem 1004, a display device subsystem 1006, and a storage subsystem 1010 including one or more computer-readable storage media 1008. The subsystems may also include a memory subsystem 1012, a communication subsystem 1020, and a processing subsystem 1022.

In device 1000, bus 1002 facilitates communication between the various subsystems. Although a single bus 1002 is shown, alternative bus configurations may also be used. Bus 1002 may include any bus or other components to facilitate such communication as is known to one of ordinary skill in the art. Examples of such bus systems may include a local bus, parallel bus, serial bus, bus network, and/or multiple bus systems coordinated by a bus controller. Bus 1002 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1004 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1004 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer device 1000 may include a display device subsystem 1006. Display device subsystem may include one or more lights, such as one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1006 may include a controller and/or interface for controlling and/or communicating with an external display, such as any of the above-mentioned display technologies.

As shown in FIG. 10, device 1000 may include storage subsystem 1010 including various computer-readable storage media 1008, such as hard disk drives, solid-state drives (including RAM-based and/or flash-based SSDs), or other storage devices. In various embodiments, computer-readable storage media 1008 can be configured to store software, including programs, code, or other instructions, that is executable by a processor to provide the functionality described herein. For example, the instruction, when executed, can enable a computing device to obtain a request for scheduling time for travel between a plurality of destinations along a multi-segment path for a plurality of people, the plurality of people divided into groups, the request specifying at least an origin and a destination; determine a plurality of itineraries for the request; determine respective itinerary characteristics for the plurality of itineraries; determine environmental characteristics for the plurality of itineraries; evaluate the plurality of itineraries based on the respective itinerary characteristics and the environmental characteristics to generate itinerary scores; sort the plurality of itineraries based on the respective itinerary scores to generate a sorted list; select a routing solution for individual groups from the sorted list, individual routing solutions specifying an amount of time to spend at the plurality of destinations and a departure time from an origination location; and provide information about the individual routing solutions to appropriate entities.

In some embodiments, storage system 1010 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 1010 can include a media reader, card reader, or other storage interfaces to communicate with one or more external and/or removable storage devices. In various embodiments, computer-readable storage media 1008 can include any appropriate storage medium or combination of storage media. For example, computer-readable storage media 1008 can include, but is not limited to, any one or more of random-access memory (RAM), read-only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer-readable storage media can include data signals or any other medium through which data can be transmitted and/or received.

Memory subsystem 1012 can include various types of memory, including RAM, ROM, flash memory, or other memory. Memory 1012 can include SRAM (static RAM) or DRAM (dynamic RAM). In some embodiments, memory 1012 can include a BIOS (basic input/output system) or other firmware configured to manage initialization of various components during, e.g., startup. As shown in FIG. 10, memory 1012 can include applications 1014 and application data 1016. Applications 1014 may include programs, code, or other instructions, that can be executed by a processor. Applications 1014 can include various applications such as browser clients, campaign management applications, data management applications, and any other application. Application data 1016 can include any data produced and/or consumed by applications 1014. Memory 1012 can additionally include operating system 1018, such as macOS®, Windows®, Linux®, various UNIX® or UNIX- or Linux-based operating systems, or other operating systems.

Device 1000 can also include a communication subsystem 1020 configured to facilitate communication between device 1000 and various external computer systems and/or networks (such as the Internet, a local area network (LAN), a wide area network (WAN), a mobile network, or any other network). Communication subsystem 1020 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. Additionally, or alternatively, communication subsystem 1020 can include hardware and/or software components to communicate with satellite-based or ground-based location services, such as GPS (global positioning system). In some embodiments, communication subsystem 1020 may include, or interface with, various hardware or software sensors. The sensors may be configured to provide continuous or and/or periodic data or data streams to a computer system through communication subsystem 1020.

As shown in FIG. 10, processing system 1022 can include one or more processors or other devices operable to control computing device 1000. Such processors can include single-core processors 1024, multi-core processors, which can include central processing units (CPUs), graphical processing units (GPUs), application specific integrated circuits (ASICs), digital signal processors (DSPs) or any other generalized or specialized microprocessor or integrated circuit. Various processors within processing system 1022, such as processors 1024 and 1026, may be used independently or in combination depending on the application.

Various other configurations are may also be used, with particular elements that are depicted as being implemented in hardware may instead be implemented in software, firmware, or a combination thereof. One of ordinary skill in the art will recognize various alternatives to the specific embodiments described herein.

Various other configurations are may also be used, with particular elements that are depicted as being implemented in hardware may instead be implemented in software, firmware, or a combination thereof. One of ordinary skill in the art will recognize various alternatives to the specific embodiments described herein.

The various embodiments can be implemented in a wide variety of operating environments, which in some cases can include one or more user computers or computing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer-readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

The methods, systems, and devices discussed above are described with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the above description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Having been provided with the description and illustration of the present application, one skilled in the art may envision variations, modifications, and alternate embodiments falling within the general inventive concept discussed in this application that do not depart from the scope of the following claims.

What is claimed is:

1. A computing system, comprising:
at least one computing processor; and
memory including instructions that, when executed by the at least one computing processor, enable the computing system to:
obtain a request for travel between a plurality of destinations for a first user account and a second user account, the request specifying a first origin for the first user account, a second origin for the second user account, a shared destination, and an end time at the shared destination, the first origin and the second origin being different;
obtain a configuration file specifying a first set of destinations associated with the first user account and a second set of destinations associated with the second user account;
evaluate a plurality of itineraries based on the configuration file to generate respective itinerary scores;
sort the plurality of itineraries based on the respective itinerary scores to generate a sorted list of itineraries;
select a first routing solution for the first user account and a second routing solution for the second user account from the sorted list of itineraries, the first routing solution and the second routing solution satisfying at least one crowd performance criterion, the first routing solution specifying a first order of destinations along a first multi-segment path and an amount of time to spend at each destination of the first multi-segment path, the second routing solution specifying a second order of destinations along a second multi-segment path and an amount of time to spend at each destination of the second multi-segment path;
provide the first routing solution to the first user account and the second routing solution to the second user account, the first routing solution and the second routing solution specifying a unidirectional path between the first origin and the shared destination and the second origin and the shared destination;
obtain position information associated with the first user account and the second user account; and
iteratively update the amount of time to spend at each of the plurality of destinations along the first multi-segment path for the first user account and the second multi-segment path for the second user account based on the position information.

2. The computing system of claim 1, wherein the instructions when executed by the at least one computing processor further enable the computing system to:
obtain user preference information, the user preference information specifying road conditions, road capacity constraints, and building capacity constraints; and
generate the respective itinerary scores using the user preference information.

3. The computing system of claim 1, wherein the instructions when executed by the at least one computing processor further enable the computing system to:
obtain compliance data, the compliance data specifying road conditions, road capacity constraints, restricted locations, building closure times, event closure times, and building capacity constraints; and
generate the respective itinerary scores using the compliance data.

4. The computing system of claim 1, wherein the instructions when executed by the at least one computing processor further enable the computing system to:
obtain environmental characteristics associated with the request for travel, the environmental characteristics including weather conditions and road conditions; and
generate the respective itinerary scores using the environmental characteristics.

5. The computing system of claim 4, wherein the instructions when executed by the at least one computing processor further enable the computing system to:
obtain crowd data, the crowd data specifying crowd density, crowd directional flow, and crowd pace; and
generate the respective itinerary scores using the crowd data.

6. The computing system of claim 4, wherein the instructions when executed by the at least one computing processor further enable the computing system to:
iteratively update one of the first routing solution or the second routing solution to mitigate one of crowd turbulence, crowd directional flow, crowd congestion, or crowd pace.

7. The computing system of claim 1, wherein an itinerary score is a combination of a user preference score, a compliance data score, an environmental characteristics score, and a crowd data score, and wherein the instructions when executed by the at least one computing processor further enable the computing system to:
compare the itinerary score to a crowd performance threshold; and
determine whether the itinerary score satisfies the at least one crowd performance criterion.

8. The computing system of claim 1, wherein the instructions when executed by the at least one computing processor further enable the computing system to:
monitor progress for the first routing solution and the second routing solution; and
provide a notification when progress for one of the first routing solution or the second routing solution does not satisfy a progress threshold.

9. A method, comprising:
obtaining a request for travel between a plurality of destinations for a first user account and a second user account, the request specifying a first origin for the first user account, a second origin for the second user account, a shared destination, and an end time at the shared destination, the first origin and the second origin being different;
obtaining a configuration file specifying a first set of destinations associated with the first user account and a second set of destinations associated with the second user account;
evaluating a plurality of itineraries based on the configuration file to generate respective itinerary scores;
sorting the plurality of itineraries based on the respective itinerary scores to generate a sorted list of itineraries;
selecting a first routing solution for the first user account and a second routing solution for the second user account from the sorted list of itineraries, the first routing solution and the second routing solution satisfying at least one crowd performance criterion, the first routing solution specifying a first order of destinations along a first multi-segment path and an amount of time to spend at each destination of the first multi-segment path, the second routing solution specifying a second order of destinations along a second multi-segment path and an amount of time to spend at each destination of the second multi-segment path;
providing the first routing solution to the first user account and the second routing solution to the second user account, the first routing solution and the second routing solution specifying a unidirectional path between the first origin and the shared destination and the second origin and the shared destination;

obtaining position information associated with the first user account and the second user account; and iteratively updating the amount of time to spend at each of the plurality of destinations along the first multi-segment path for the first user account and the second multi-segment path for the second user account based on the position information.

10. The method of claim 9, wherein the first order of destinations is provided by the first user account and the second order of destinations is provided by the second user account.

11. The method of claim 9, wherein the first routing solution and the second routing solution specify a unidirectional navigation path between respective origins and the shared destination.

12. The method of claim 9, wherein the first routing solution and the second routing solution is based on environmental characteristics.

13. The method of claim 12, wherein the environmental characteristics include weather conditions or road conditions.

14. The method of claim 12, further comprising:
iteratively update one of the first routing solution or the second routing solution to mitigate one of crowd turbulence, crowd directional flow, crowd congestion, or crowd pace.

15. The method of claim 9, wherein an itinerary score is a combination of a user preference score, a compliance data score, an environmental characteristics score, and a crowd data score, the method further comprising:
comparing the itinerary score to a crowd performance threshold; and
determining whether the itinerary score satisfies the at least one crowd performance criterion.

16. The method of claim 9, further comprising:
monitoring progress for the first routing solution and the second routing solution; and
providing a notification when progress for one of the first routing solution or the second routing solution does not satisfy a progress threshold.

17. A non-transitory computer readable storage medium storing one or more sequences of instructions executable by one or more processors to perform a set of operations comprising:
obtaining a request for travel between a plurality of destinations for a first user account and a second user account, the request specifying a first origin for the first user account, a second origin for the second user account, a shared destination, and an end time at the shared destination, the first origin and the second origin being different;
obtaining a configuration file specifying a first set of destinations associated with the first user account and a second set of destinations associated with the second user account;

evaluating a plurality of itineraries based on the configuration file to generate respective itinerary scores;

sorting the plurality of itineraries based on the respective itinerary scores to generate a sorted list of itineraries;

selecting a first routing solution for the first user account and a second routing solution for the second user account from the sorted list of itineraries, the first routing solution and the second routing solution satisfying at least one crowd performance criterion, the first routing solution specifying a first order of destinations along a first multi-segment path and an amount of time to spend at each destination of the first multi-segment path, the second routing solution specifying a second order of destinations along a second multi-segment path and an amount of time to spend at each destination of the second multi-segment path;

providing the first routing solution to the first user account and the second routing solution to the second user account, the first routing solution and the second routing solution specifying a unidirectional path between the first origin and the shared destination and the second origin and the shared destination;

obtaining position information associated with the first user account and the second user account; and iteratively updating the amount of time to spend at each of the plurality of destinations along the first multi-segment path for the first user account and the second multi-segment path for the second user account based on the position information.

18. The non-transitory computer readable storage medium of claim 17, further comprising instructions executed by the one or more processors to perform the operations of:
iteratively update one of the first routing solution or the second routing solution to mitigate one of crowd turbulence, crowd directional flow, crowd congestion, or crowd pace.

19. The non-transitory computer readable storage medium of claim 17, further comprising instructions executed by the one or more processors to perform the operations of:
generating an itinerary score by combining of a user preference score, a compliance data score, an environmental characteristics score,
comparing the itinerary score to a crowd performance threshold; and
determining whether the itinerary score satisfies the at least one crowd performance criterion.

20. The non-transitory computer readable storage medium of claim 17, further comprising instructions executed by the one or more processors to perform the operations of:
monitoring progress for the first routing solution and the second routing solution; and
providing a notification when progress for one of the first routing solution or the second routing solution does not satisfy a progress threshold.

* * * * *